(12) United States Patent
Nakamura et al.

(10) Patent No.: US 12,395,416 B2
(45) Date of Patent: Aug. 19, 2025

(54) VEHICLE-MOUNTED RELAY DEVICE

(71) Applicant: DENSO CORPORATION, Kariya (JP)

(72) Inventors: Azusa Nakamura, Kariya (JP); Takahiro Sasaki, Kariya (JP); Shota Mizoguchi, Kariya (JP); Masayoshi Asano, Kariya (JP)

(73) Assignee: DENSO CORPORATION, Kariya (JP)

( * ) Notice: Subject to any disclaimer, the term of this patent is extended or adjusted under 35 U.S.C. 154(b) by 380 days.

(21) Appl. No.: 18/173,521

(22) Filed: Feb. 23, 2023

(65) Prior Publication Data

US 2023/0208733 A1 Jun. 29, 2023

Related U.S. Application Data

(63) Continuation of application No. PCT/JP2021/030758, filed on Aug. 23, 2021.

(30) Foreign Application Priority Data

Sep. 23, 2020 (JP) ................................ 2020-158706

(51) Int. Cl.
*H04L 43/0823* (2022.01)
*B60R 16/023* (2006.01)
*H04L 67/12* (2022.01)

(52) U.S. Cl.
CPC ........ *H04L 43/0823* (2013.01); *B60R 16/023* (2013.01); *H04L 67/12* (2013.01)

(58) Field of Classification Search
CPC .... G05B 15/02; G07C 5/0825; G07C 5/0808; H01R 31/06; B60R 16/023; H04L 13/00; H04L 12/28; H04L 12/46
See application file for complete search history.

(56) References Cited

U.S. PATENT DOCUMENTS

| | | | |
|---|---|---|---|
| 2014/0119199 A1* | 5/2014 | Watanabe | H04W 28/0231 370/242 |
| 2018/0131700 A1* | 5/2018 | Ando | H04L 63/162 |
| 2020/0203906 A1* | 6/2020 | Thürmer | G05B 15/02 |
| 2020/0304340 A1 | 9/2020 | Itoda | |
| 2023/0308256 A1* | 9/2023 | Kitagawa | H04L 7/0033 |

* cited by examiner

*Primary Examiner* — Mahran Y Abu Roumi
(74) *Attorney, Agent, or Firm* — Posz Law Group, PLC

(57) ABSTRACT

A vehicle-mounted relay device includes a hardware unit implementing functions of first to third layer of OSI model, and a software unit implementing functions of fourth and upper layers of OSI model. The hardware unit includes a first abnormality recording section in which an abnormal frame detected during data relay is recorded, and a first abnormality recording processing section storing, in response to detection of the abnormal frame, the abnormal frame in the first abnormality recording section. The software unit includes a second vehicle information recording section in which vehicle information sequentially transmitted from an end ECU is stored, and a first diagnostic recording processing section, which reads out the abnormal frame from the first abnormality recording section and reads out the vehicle information from the second vehicle information recording section, and stores the readout abnormal frame and vehicle information in a diagnostic information recording section as diagnostic information.

12 Claims, 23 Drawing Sheets

VEHICLE-MOUNTED RELAY DEVICE

CROSS REFERENCE TO RELATED APPLICATIONS

The present application is a continuation application of International Patent Application No. PCT/JP2021/030758 filed on Aug. 23, 2021 which designated the U.S. and claims the benefit of priority from Japanese Patent Application No. 2020-158706 filed on Sep. 23, 2020. The entire disclosures of all of the above applications are incorporated herein by reference.

TECHNICAL FIELD

The present disclosure relates to a vehicle-mounted relay device.

BACKGROUND

Conventionally, a relay device is used in a vehicle-mounted communication network. The relay device includes multiple ports. When one port receives an input signal, the input signal is transmitted to a destination terminal that is communicably connected to the same relay device. The destination terminal is identified based on destination identification information included in the input signal.

SUMMARY

The present disclosure provides a vehicle-mounted relay device used in a vehicle. The vehicle-mounted relay device includes: a hardware unit performing a hardware operation; and a software unit performing a software operation. The hardware operation implements functions of a first layer to a third layer of an OSI reference model. The software operation implements functions of a fourth layer and upper layers of the OSI reference model. The hardware unit includes a second layer relay section, which implements a relay function in the second layer of the OSI reference model, and a third layer relay section, which implements a relay function in the third layer of the OSI reference model. The software unit includes a vehicle information recording processing section storing vehicle information, which is sequentially transmitted from another vehicle-mounted device, in a vehicle information recording section. The vehicle information recording section is readable by the software unit. The hardware unit includes a first abnormality recording processing section storing, in response to an abnormal frame being detected during a data relay in the second layer relay section or in the third layer relay section, the detected abnormal frame in a first abnormality recording section. The first abnormality recording section is readable by the software unit. The software unit includes a first diagnostic recording processing section. The first diagnostic recording processing section reads out the abnormal frame from the first abnormality recording section and stores the readout abnormal frame together with the vehicle information, which is read out from the vehicle information recording section, in a diagnostic information recording section as diagnostic information. The diagnostic information recording section is readable by the software unit.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
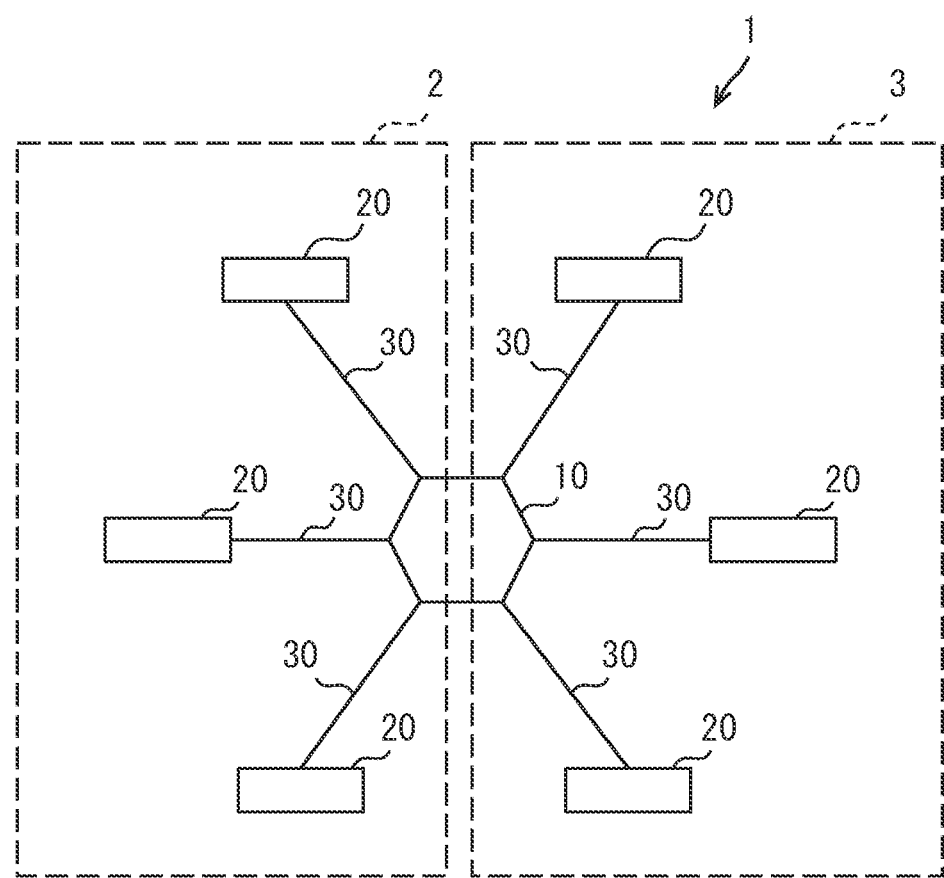
FIG. 1 is a diagram showing an example of a schematic configuration of a vehicle-mounted communication system.

Conventionally, a vehicle-mounted relay device is provided by a vehicle-mounted ECU having a relay function. The vehicle-mounted ECU may include a physical layer and a data link layer, which are defined in OSI reference model, and the physical layer and the data link layer may be configured by ASIC. The vehicle-mounted ECU may include an upper layer, which is configured by a microcomputer, above the physical layer and the data link layer. In this vehicle-mounted ECU, when the relay function is implemented by a network layer, which corresponds to a third layer, the relay function is implemented by the microcomputer in software manner.

When the relay function is implemented by the network layer, the relay function requires a high processing load since the relay is required to be executed across one or more networks. Therefore, even though a high-performance microcomputer is used for the relay function, a communication delay may occur. Due to the high processing load of relay function, large amount of heat is generated by the relay function. In order to solve the above-described difficulties, in a known vehicle-mounted relay device, the functions of first to third layers are executed by a hardware circuit, while the functions of fourth and higher layers are executed by a microcomputer.

The above known art does not assume a configuration in which other functions are also provided by the second and third layers, which are executed by the hardware circuit. Herein, other functions refer to functions other than the relay function. In the known art, when an abnormal frame is detected during relay operation executed by the second and third layers, the abnormal frame can be recorded. However, information sent from another electronic control device (hereinafter referred to as vehicle information) cannot be recorded together with the abnormal frame as diagnostic information (hereinafter also referred to as diag information).

When a diagnostic tool reads an abnormal frame, since the hardware circuit does not have an application layer, a response to the abnormal frame cannot be made. With consideration of this difficulty, when an application layer is installed in the hardware circuit, the hardware circuit needs to be changed every time the specification of application layer is changed. This will increase a development cost.

According to a first aspect of the present disclosure, a vehicle-mounted relay device used in a vehicle includes: a hardware unit performing a hardware operation; and a software unit performing a software operation. The hardware operation implements functions of a first layer to a third layer of an OSI reference model. The software operation implements functions of a fourth layer and upper layers of the OSI reference model. The hardware unit includes a second layer relay section, which implements a relay function in the second layer of the OSI reference model, and a third layer relay section, which implements a relay function in the third layer of the OSI reference model. The software unit includes a vehicle information recording processing section storing vehicle information, which is sequentially transmitted from another vehicle-mounted device, in a vehicle information recording section. The vehicle information recording section is readable by the software unit. The hardware unit includes a first abnormality recording processing section storing, in response to an abnormal frame being detected during a data relay in the second layer relay section or in the third layer relay section, the detected abnormal frame in a first abnormality recording section. The first abnormality recording section is readable by the software unit. The software unit includes a first diagnostic recording processing section. The first diagnostic recording processing section reads out the abnormal frame from the first abnormality recording section and stores the readout abnormal frame together with the vehicle information, which is read out from the vehicle information recording section, in a diagnostic information recording section as diagnostic information. The diagnostic information recording section is readable by the software unit.

According to the above configuration, the second layer relay section, which implements the relay function in the second layer of the OSI reference model, and the third layer relay section, which implements the relay function in the third layer of the OSI reference model, are provided by the hardware circuit. Thus, the second layer relay section and the third layer relay section are implemented by the operation of hardware circuit. By implementing the second layer relay section and the third layer relay section with the operation of hardware circuit, the processing speed can be increased. Therefore, communication delay is less likely to occur. In addition, heat generation can be suppressed by implementing the relay function with operation executed by the hardware circuit. The software unit needs to execute only the functions of the fourth layer and higher layers above the fourth layer. Thus, a device that has low software support performance can also be used as the device for operating the software unit.

According to the above configuration, the software unit reads out the abnormal frame, which is recorded by the operation of the hardware unit in the first abnormality recording section, and also reads out the vehicle information, which is recorded by the operation of software unit in the vehicle information recording section. Then, the software unit correlates the readout abnormal frame with the readout vehicle information, and stores as the diagnostic information in the diagnostic information recording section. The diagnostic information can be read out by the software unit. As described above, an abnormal frame is detected by the operation of the hardware unit, and the vehicle information is recorded by the operation of the software unit. Thus, the software unit can read out the diagnostic information, which includes the vehicle information transmitted from other electronic control units and the abnormal frame correlated with the vehicle information. Since the software unit executes the functions of fourth layer and upper layer, the function of application layer is executed by the software unit. Therefore, the diagnostic information recorded in the diagnostic information recording section can be read out by the diagnostic tool. Since the diagnostic information can be read without installing the application layer in the hardware unit, it is possible to easily change the specification of the application layer and reduce the development cost.

As a result, an occurrence of communication delay and heat generation can be suppressed. Further, while enabling reading out of diagnostic information about abnormal frame detected during the relay operation executed by the hardware unit, the development cost can be suppressed.

According to a second aspect of the present disclosure, a vehicle-mounted relay device used in a vehicle, includes: a hardware unit operating a hardware; and a software unit operating a software. The hardware unit implements functions of a first layer to a third layer of an OSI reference model. The software unit implements functions of a fourth layer and upper layers of the OSI reference model. The hardware unit includes a second layer relay section, which implements a relay function in the second layer of the OSI reference model, and a third layer relay section, which implements a relay function in the third layer of the OSI reference model. The software unit includes a vehicle information transmission section that transmits, to the hardware unit, vehicle information sequentially transmitted from another vehicle-mounted device. The hardware unit includes a second abnormality recording processing section. The second abnormality recording processing section stores, in response to an abnormal frame being detected during a data relay in the second layer relay section or in the third layer relay section, the abnormal frame in a second abnormality recording section. The second abnormality recording processing section stores, in the second abnormality recording section, the abnormal frame by correlating the abnormal frame with the vehicle information, which corresponds to a detection time of the abnormal frame and is transmitted from the vehicle information transmission section. The second abnormality recording section is readable by the software unit. The software unit includes a second diagnostic recording processing section. The second diagnostic recording processing section reads out, from the second abnormality recording section, the abnormal frame together with the vehicle information correlated with the abnormal frame, and stores the readout abnormal frame and the readout vehicle information in a diagnostic information recording section as diagnostic information. The diagnostic information recording section is readable by the software unit.

According to the above configuration, the second layer relay section, which implements the relay function in the second layer of the OSI reference model, and the third layer relay section, which implements the relay function in the third layer of the OSI reference model, are provided by the hardware circuit. Thus, the second layer relay section and the third layer relay section are implemented by the operation of hardware circuit. By implementing the second layer relay section and the third layer relay section with the operation of hardware circuit, the processing speed can be increased. Therefore, communication delay is less likely to occur. In addition, heat generation can be suppressed by implementing the relay function with operation executed by the hardware circuit. The software unit needs to execute only the functions of the fourth layer and higher layers above the fourth layer. Thus, a device that has low software support performance can also be used as the device for operating the software unit.

According to the above configuration, the second diagnostic recording processing section of the software unit reads out the abnormal frame detected during data relay in the second layer relay section or in the third layer relay section. The abnormal frame is stored by the operation of the hardware unit. The second diagnostic recording processing section further reads out the vehicle information, which corresponds to the detection time of abnormal frame and is transmitted from the vehicle information transmission section. Then, the second diagnostic recording processing section stores, as the diagnostic information, the readout abnormal frame and the vehicle information in the diagnostic information recording section, which is readable by the software unit. According to the above configuration, the software unit can read out the stored diagnostic information in which the vehicle information transmitted from another electronic control unit at the detection time of abnormal frame is correlated with the abnormal frame. Since the software unit executes the functions of fourth layer and upper layer, the function of application layer is executed by the software unit. Therefore, the diagnostic information recorded in the diagnostic information recording section can be read out by the diagnostic tool. Since the diagnostic information can be read without installing the application layer in the hardware unit, it is possible to easily change the specification of the application layer and reduce the development cost.

As a result, an occurrence of communication delay and heat generation can be suppressed. Further, while enabling reading out of diagnostic information about abnormal frame detected during the relay operation executed by the hardware unit, the development cost can be suppressed.

The following will describe embodiments of the present disclosure with reference to the accompanying drawings. For convenience of description, among multiple embodiments, a configuration having the same function as a configuration shown in the drawing and described in the previous embodiment may be indicated by the same reference symbol, and the description thereof may be omitted. The description of other embodiments may be referred to with respect to the configurations assigned with the same reference symbols.

First Embodiment

Configuration of Vehicle-Mounted Communication System 1

The following will describe a first embodiment of the present disclosure with reference to the accompanying drawings. First, a vehicle-mounted communication system 1 will be described with reference to FIG. 1. The vehicle-mounted communication system 1 is configured according to an in-vehicle Ethernet standard. Ethernet is registered trademark. The vehicle-mounted communication system 1 is mounted on a vehicle. Hereinafter, the vehicle to which the vehicle-mounted communication system 1 is installed is referred to as a subject vehicle.

As shown in FIG. 1, the vehicle-mounted communication system 1 includes a vehicle-mounted relay device 10, an end ECU 20, and a cable 30. In the example shown in FIG. 1, the vehicle-mounted communication system 1 includes six end ECUs 20. This is only an example. The vehicle-mounted communication system 1 may include any number of end ECUs 20.

The end ECU 20 corresponds to a node, and is connected to the vehicle-mounted relay device 10 via a cable 30. The node may include an electronic control unit (that is, an ECU), a sensor or the like. Alternatively, another vehicle-mounted relay device 10 may be connected as the node. Each end ECU 20 directly communicates only with the vehicle-mounted relay device 10. When transmitting a signal to another node, the end ECU 20 includes an address of destination node in the signal. The end ECU 20 outputs this signal to the vehicle-mounted relay device 10 via the cable 30. For example, the cable 30 may be a twisted pair cable.

The vehicle-mounted relay device 10 divides multiple nodes connected to the vehicle-mounted relay device 10 into two virtual LANs (VLANs) 40 and 50. The vehicle-mounted relay device 10 may divide multiple nodes connected to the vehicle-mounted relay device 10 into three or more VLANs.

Configuration of Vehicle-Mounted Relay Device 10

Figure 2:
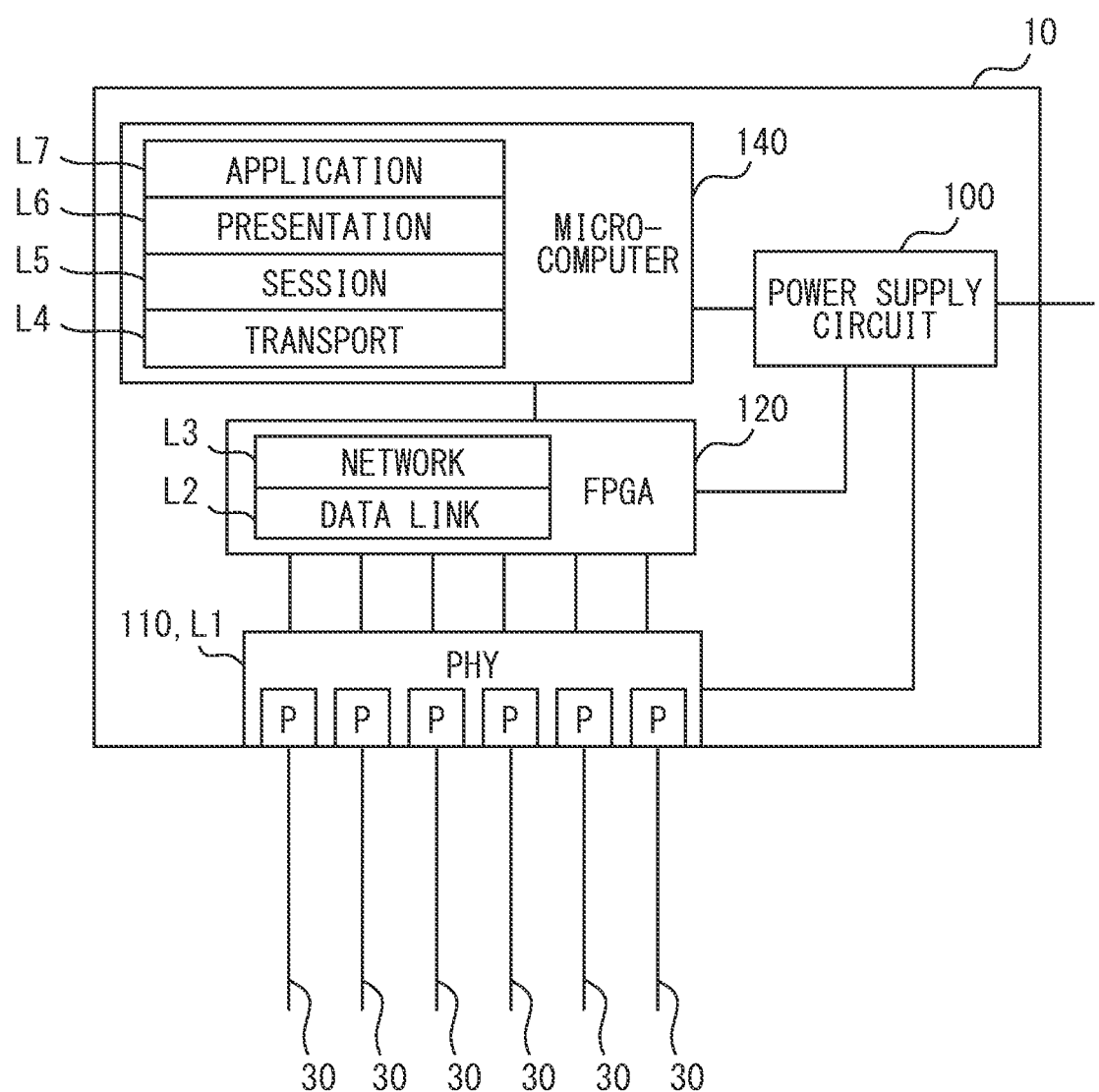
FIG. 2 is a diagram showing an example of a schematic configuration of a vehicle-mounted relay device.

The following will describe a configuration of the vehicle-mounted relay device 10 with reference to FIG. 2. As shown in FIG. 2, the vehicle-mounted relay device 10 includes a power supply circuit 100, a PHY 110, an FPGA (field-programmable gate array) 120, and a microcomputer 140.

The power supply circuit 100 supplies power to the PHY 110, the FPGA 120, and the microcomputer 140. The PHY 110 has multiple ports P. In FIG. 2, the PHY includes six ports P as an example. Each port P is connected to one end of the cable 30. The other end of the cable 30 is connected to the end ECU 20.

The PHY 110 converts the signal supplied from the FPGA 120 into an electric signal that can be transmitted through the cable 30. The PHY 110 also converts a signal supplied from the end ECU 20 via the cable 30 into a signal that can be processed by the FPGA 120. The PHY 110 corresponds to the physical layer (that is, the first layer) L1 in the OSI reference model. In addition to the signal conversion described above, the PHY 110 performs frame encoding, serial-parallel conversion, signal waveform conversion, or the like.

The PHY 110 is a hardware circuit, and includes an analog circuit or the like. The PHY 110 corresponds to a hardware unit. As an example, the PHY 110 is provided by an IC. In FIG. 2, as an example, the PHY 110 includes multiple ports P. The configuration of PHY is not necessarily limited to this example. Multiple PHYs 110 may be individually configured such that each PHY corresponds to one port P.

The FPGA 120 is a type of integrated electronic circuit, such as a programmable logic device (PLD). The FPGA 120 corresponds to a hardware circuit and a hardware unit. The FPGA 120 is programmed to perform functions of the second layer L2 and the third layer L3 in the OSI reference model.

The second layer L2 is the data link layer. The FPGA 120 relays the communications in the same VLAN 40, 50 by the function of the second layer L2. The third layer L3 is the network layer. The FPGA 120 relays the communication between different networks by the function of the third layer L3.

The microcomputer 140 is a general purpose computer, and includes a processor, a memory, an I/O, and a bus connecting these elements. The microcomputer 140 executes various processes by executing control programs stored in a memory. The microcomputer 140 performs the functions of the fourth layer L4, the fifth layer L5, the sixth layer L6, and the seventh layer L7 by executing the programs stored in the memory. That is, the functions of the fourth layer L4, the fifth layer L5, the sixth layer L6, and the seventh layer L7 are implemented by software processing. The memory referred to here is a non-transitory tangible storage medium, and stores programs and data that can be read by a computer. The non-transitory tangible storage medium may be provided by a semiconductor memory, a magnetic disk, or the like. The microcomputer 140 corresponds to a software unit.

The fourth layer L4 is the transport layer. The microcomputer 140 executes an inter-program communication and data transfer guarantee by the function of the fourth layer L4. The fifth layer L5 is the session layer. The sixth layer L6 is the presentation layer. The seventh layer L7 is the application layer. The microcomputer 140 performs user authentication using the function of the fifth layer L5. The microcomputer 140 performs data encoding and data decoding using the function of the sixth layer L6. The microcomputer 140 executes user interface using the function of the seventh layer L7. The vehicle-mounted relay device 10 having these functions may also be referred to as a switching hub ECU.

Configuration of FPGA 120

Figure 3:
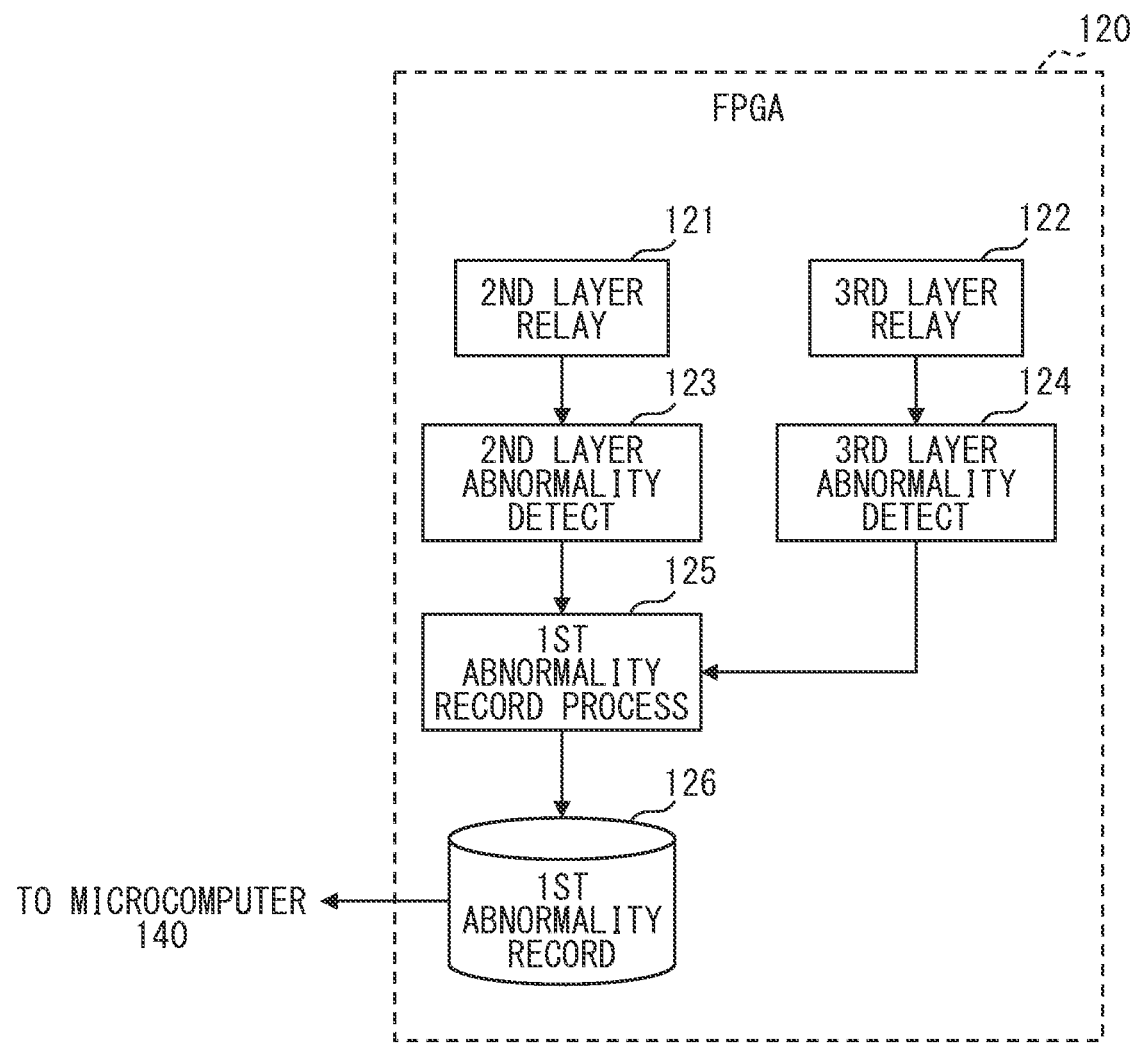
FIG. 3 is a diagram showing an example of a schematic configuration of a FPGA.

The following will describe an example of a configuration of the FPGA 120 with reference to FIG. 3. As shown in FIG. 3, the FPGA 120 includes a second layer relay section 121, a third layer relay section 122, a second layer abnormality detection section 123, a third layer abnormality detection section 124, a first abnormality recording processing section 125, and a first abnormality recording section 126 as functional blocks.

The second layer relay section 121 relays the communication within the same VLAN 40, 50. The second layer relay section 121 may determine the node that transmits the signal based on the media access control (MAC) address. The function of second layer implemented by the second layer relay section 121 may be referred to as a switch.

The third layer relay section 122 relays the communication between different networks. The third layer relay section 122 may determine the node that transmits the signal based on internet protocol (IP) address. The function of third layer implemented by the third layer relay section 122 may be referred to as a switch.

The second layer abnormality detection section 123 detects an abnormal frame in the signal relayed by the second layer relay section 121. The abnormal frame referred to here is a frame that has an abnormality and cannot be relayed due to the abnormality. As an example, the second layer abnormality detection section detects an abnormality in the IP addresses and MAC addresses of transmission source and transmission destination. The abnormalities in the IP address and the MAC address refer to abnormalities in which access is not permitted by an access control list (ACL). The second layer abnormality detection section may detect a communication under unspecified protocol as an abnormal frame. The second layer abnormality detection section 123 may be configured to not relay the detected abnormal frame.

The third layer abnormality detection section 124 detects an abnormal frame in the signal relayed by the third layer relay section 122. As an example, the third layer abnormality detection section detects an abnormality in the IP addresses of transmission source and transmission destination. The third layer abnormality detection section may detect a communication under unspecified protocol as an abnormal frame. The third layer abnormality detection section 124 may be configured to not relay the detected abnormal frame.

When the second layer abnormality detection section 123 detects an abnormal frame, the first abnormality recording processing section 125 records the detected abnormal frame in the first abnormality recording section 126. When the third layer abnormality detection section 124 detects an abnormal frame, the first abnormality recording processing section 125 records the detected abnormal frame in the first abnormality recording section 126. For example, a volatile memory may be used as the first abnormality recording section 126. That is, the first abnormality recording section 126 is a buffer. As another example, a non-volatile memory may be used as the first abnormality recording section 126.

The first abnormality recording processing section 125 may accumulate the detected abnormal frame in the first abnormality recording section 126 each time either the second layer abnormality detecting section 123 or the third layer abnormality detecting section 124 detects abnormal data. When recording the detected abnormal frames in the first abnormality recording section 126, the first abnormality recording processing section 125 may record the abnormal frames in chronological order. A storage capacity of the first abnormality recording section 126 is limited. When the storage capacity becomes insufficient for the records to be stored, the oldest records may be overwritten in order.

The first abnormality recording processing section 125 records the header of the frame excluding the payload as the abnormal frame in the first abnormality recording section 126 in order to prevent the memory of the first abnormality recording section 126 from being overloaded. As another example, the first abnormality recording processing section 125 may record a part of the frame, which includes the payload and the header, in the first abnormality recording section 126 as the abnormal frame.

Configuration of Microcomputer 140

Figure 4:
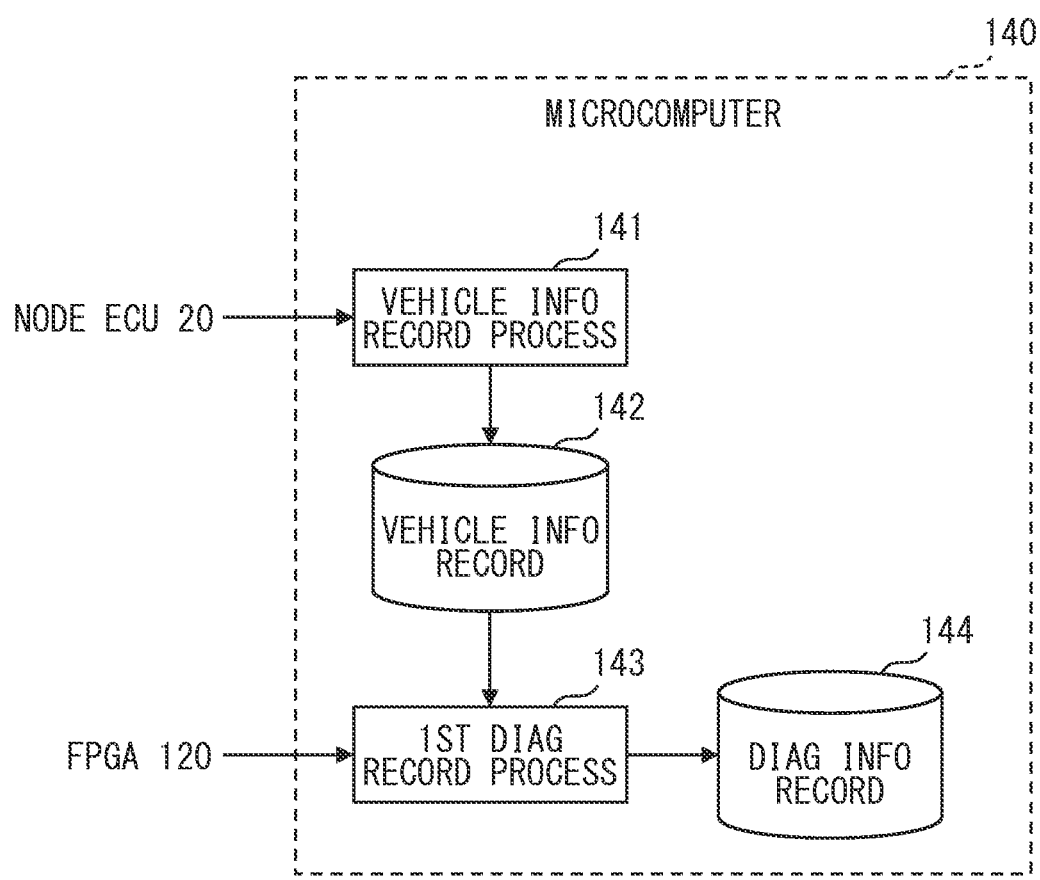
FIG. 4 is a diagram showing an example of a schematic configuration of a microcomputer.

The following will describe an example of a configuration of the microcomputer 140 with reference to FIG. 4. As shown in FIG. 4, the microcomputer 140 includes a vehicle information recording processing section 141, a vehicle information recording section 142, a first diagnostic recording processing section 143, and a diagnostic information recording section 144 as functional blocks.

The vehicle information recording processing section 141 records vehicle-related information (hereinafter referred to as vehicle information) sequentially transmitted from the end ECU 20 in the vehicle information recording section 142. That is, the vehicle information sequentially transmitted from other devices mounted on the subject vehicle is recorded in the vehicle information recording section 142. For example, the vehicle information includes time information, an integrated value of section distances on a trip meter, and an integrated value of accumulated travel distances on an odometer. The vehicle information referred to here may be information correlated with diagnostic information, which is information about abnormalities of the vehicle. The vehicle information recording processing section 141 may be configured to record only one latest vehicle information in the vehicle information recording section 142.

For example, a volatile memory may be used as the vehicle information recording section 142. That is, the vehicle information recording section 142 is a buffer. As another example, a non-volatile memory may be used as the vehicle information recording section 142.

The first diagnostic recording processing section 143 periodically reads out the abnormal frame recorded in the first abnormality recording section 126 of the FPGA 120. Then, the first diagnostic recording processing section 143 records the read-out abnormal frame together with the vehicle information, which is recorded in the vehicle information recording section 142, as the diagnostic information in the diagnostic information recording section 144. The abnormal frame may be correlated with the vehicle information by combining the latest information recorded in the first abnormality recording section 126 with the latest information recorded in the vehicle information recording section 142 in order. As an example, a predetermined number of most recent abnormal frames and a predetermined number of most recent vehicle information records may be read out, and the abnormal frames may be combined with the vehicle information records from the most recent one in order. The predetermined number referred to here may be singular or plural. For example, a volatile memory may be used as the diagnostic information recording section 144.

Process Related to Diagnostic Recording Executed by Microcomputer 140

The following will describe an example of a process related to diagnostic recording (hereinafter referred to as a diagnostic recording related process) executed by the microcomputer 140 with reference to the flowchart shown in FIG. 5. For example, the flowchart shown in FIG. 5 may start when a switch (hereinafter referred to as a power switch) for starting an internal combustion engine or a motor generator of the subject vehicle is turned on. That is, the process may start when an ignition (hereinafter referred to as IG) of the subject vehicle is turned on.

In S1, when the microcomputer determines that the vehicle information is transmitted from the end ECU 20 (YES in S1), the process proceeds to S2. When the vehicle information is not transmitted from the end ECU 20 (NO in S1), the process proceeds to S7. In S2, the vehicle information recording processing section 141 records information (hereinafter referred to as vehicle information) sequentially transmitted from the end ECU 20 in the vehicle information recording section 142. The vehicle information currently recorded in the vehicle information recording section 142 may be overwritten each time new vehicle-related information is recorded, and only the latest vehicle information is kept in the vehicle information recording section 142.

In S3, when the current time is determined as the readout timing of abnormal frame (YES in S3), the process proceeds to S4. The abnormal frame is readout from the first abnormality recording section 126 of the FPGA 120 at predetermined abnormal readout cycle. When the current time is not the readout timing determined based on the abnormal readout cycle (NO in S3), the process proceeds to S7. The readout cycle of abnormal frame may be properly set to a predetermined interval.

In S4, when an abnormal frame is recorded in the first abnormality recording section 126, that is, when an abnormal frame exists (YES in S4), the process proceeds to S5. In S4, when an abnormal frame is not recorded in the first abnormality recording section 126, that is, when an abnormal frame does not exist (NO in S4), the process proceeds to S7.

In S5, the first diagnostic recording processing section 143 reads out the abnormal frame recorded in the first abnormality recording section 126. In S6, the first diagnostic recording processing section 143 stores, as the diagnostic information, the abnormal frame read out in S5 together with the vehicle information, which is recorded in the vehicle information recording section 142 and corresponds to the readout time of the abnormal frame in S5, in the diagnostic information recording section 144. For example, the first diagnostic recording processing section 143 may store, as the diagnostic information, the abnormal frame read out in S5 together with the latest vehicle information, which is most recently recorded in the vehicle information recording section 142, in the diagnostic information recording section 144. Note that the FPGA 120 may be configured to delete the abnormal frame from the first abnormality recording section 126 after the abnormal frame is read out from the first abnormality recording section 126.

In S7, when the process determines the current time is an end timing of the process related to diagnostic recording (YES in S7), the process related to diagnostic recording is ended. For example, the process related to diagnostic recording may be ended when the power switch of vehicle is turned off. More specifically, the process related to diagnostic recording may be ended when the ignition (IG) of vehicle is turned off. When the current time is not the end timing of the process related to diagnostic recording (NO in S7), the process returns to S1 and repeats the subsequent process.

Overview of First Embodiment

In the first embodiment, the vehicle-mounted relay device 10 includes the second layer L2 and the third layer L3, which are configured by the hardware circuit of FPGA 120. Thus, the second layer relay section 121 and the third layer relay section 122 are also configured by the hardware circuit. By configuring the second layer relay section 121 and the third layer relay section 122 with hardware circuits, the processing speed can be increased. Therefore, communication delay is less likely to occur. In addition, heat generation can be reduced by using the hardware circuit. The microcomputer 140 only needs to execute the process of the fourth layer L4 and upper layers, it is possible to use a less sophisticated microcomputer 140.

Further, according to the first embodiment, it is possible to record, in the microcomputer 140, the diagnostic information in which the vehicle information, such as time information transmitted from another electronic control unit is correlated with the abnormal frame. Since the microcomputer 140 executes the functions of the fourth layer and upper higher layers, the application layer is mounted in the microcomputer 140. Therefore, the diagnostic information recorded in the diagnostic information recording section 144 can be read out by the diagnostic tool. The diagnostic information can be read without installing a dedicated application device in the hardware circuit. Thus, development cost can be suppressed. As a result, an occurrence of communication delay and heat generation can be suppressed. Further, while enabling reading out of diagnostic information about abnormal frame detected during the relay operation executed by the hardware circuit, the development cost can be suppressed.

Second Embodiment

In the first embodiment, the microcomputer 140 periodically reads out the abnormal frame recorded in the FPGA 120. However, the present disclosure is not limited to this configuration. For example, a configuration that solves potential difficulty existing in the first embodiment may be used as a second embodiment. The following will describe a detailed example of the second embodiment with reference to the accompanying drawings.

Figure 6:
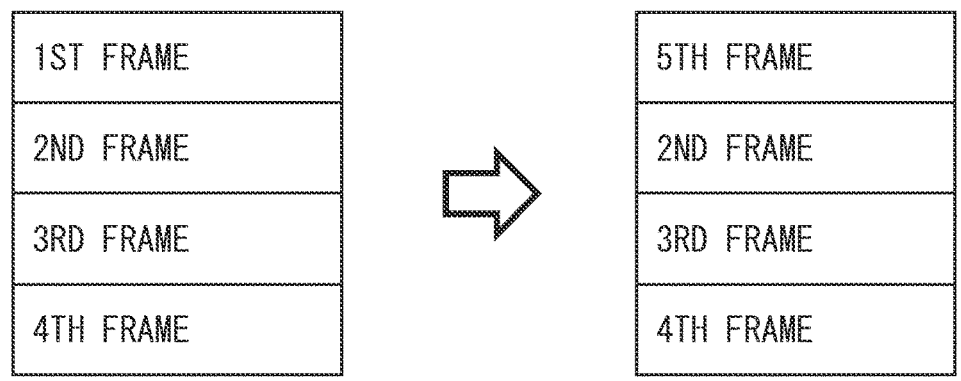
FIG. 6 is a diagram showing an exemplary case where an abnormal frame recorded in the FPGA cannot be read correctly.

First, potential difficulty existing in the first embodiment will be described. When the microcomputer 140 periodically reads out the abnormal frame recorded in the FPGA 120, the microcomputer 140 may fail to read out correct information in some cases. The following will describe a specific example with reference to FIG. 6. FIG. 6 is a diagram schematically showing abnormal frames recorded in the first abnormality recording section 126 of the FPGA 120. In the example of FIG. 6, it is assumed that four abnormal frames can be recorded in the first abnormality recording section 126.

When the microcomputer 140 periodically reads out the abnormal frame from the FPGA 120, the readout timing of the abnormal frame from the FPGA 120 may overlap with the detection timing of abnormal frame by the FPGA 120. In this case, the reading order of the abnormal frames from the first abnormality recording section 126 may become incorrect. The following will describe a specific example with reference to FIG. 6. When the fifth abnormal frame is detected during reading of the first abnormal frame, the fifth abnormal frame is recorded in the area where the first abnormal frame was recorded, not after the fourth abnormal frame. In this case, instead of the second abnormal frame, fifth abnormal frame read out after readout of the first abnormal frame. The second embodiment can solve this potential difficulty existing in the first embodiment.

The vehicle-mounted communication system 1 of the second embodiment is the same as the vehicle-mounted communication system 1 of the first embodiment, except that a vehicle-mounted relay device 10a is included instead of the vehicle-mounted relay device 10 of the first embodiment.

Configuration of Vehicle-Mounted Relay Device 10a

Figure 7:
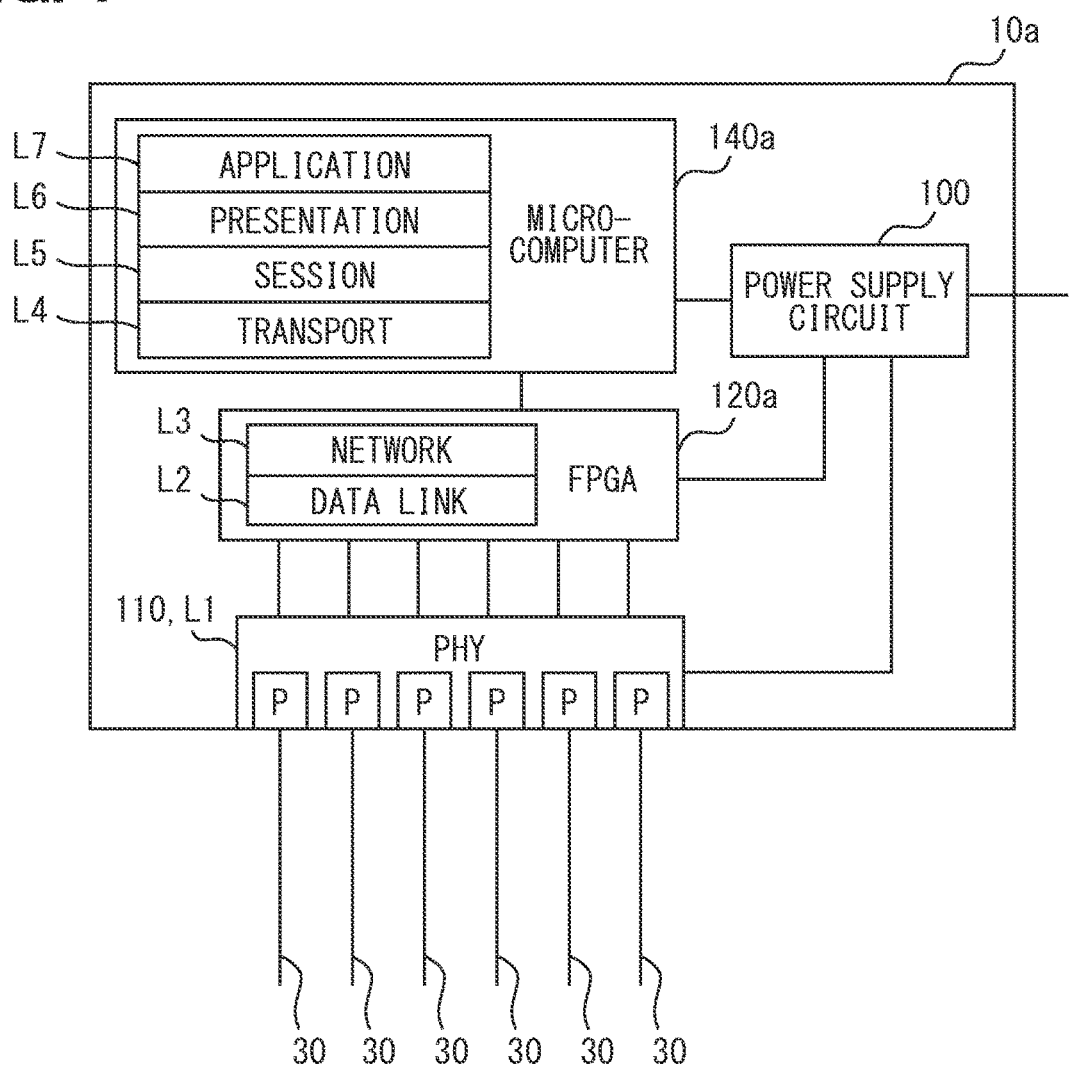
FIG. 7 is a diagram showing an example of a schematic configuration of a vehicle-mounted relay device.

The following will describe a configuration of the vehicle-mounted relay device 10a with reference to FIG. 7. As shown in FIG. 7, the vehicle-mounted relay device 10a includes a power supply circuit 100, a PHY 110, an FPGA 120a, and a microcomputer 140a. In the vehicle-related communication system 1 of the second embodiment, the vehicle-mounted relay device 10a is the same as the vehicle-mounted relay device 10 of the first embodiment, except that the FPGA 120a and the microcomputer 140a are provided instead of the FPGA 120 and the microcomputer 140 of the first embodiment.

Configuration of FPGA 120a

Figure 8:
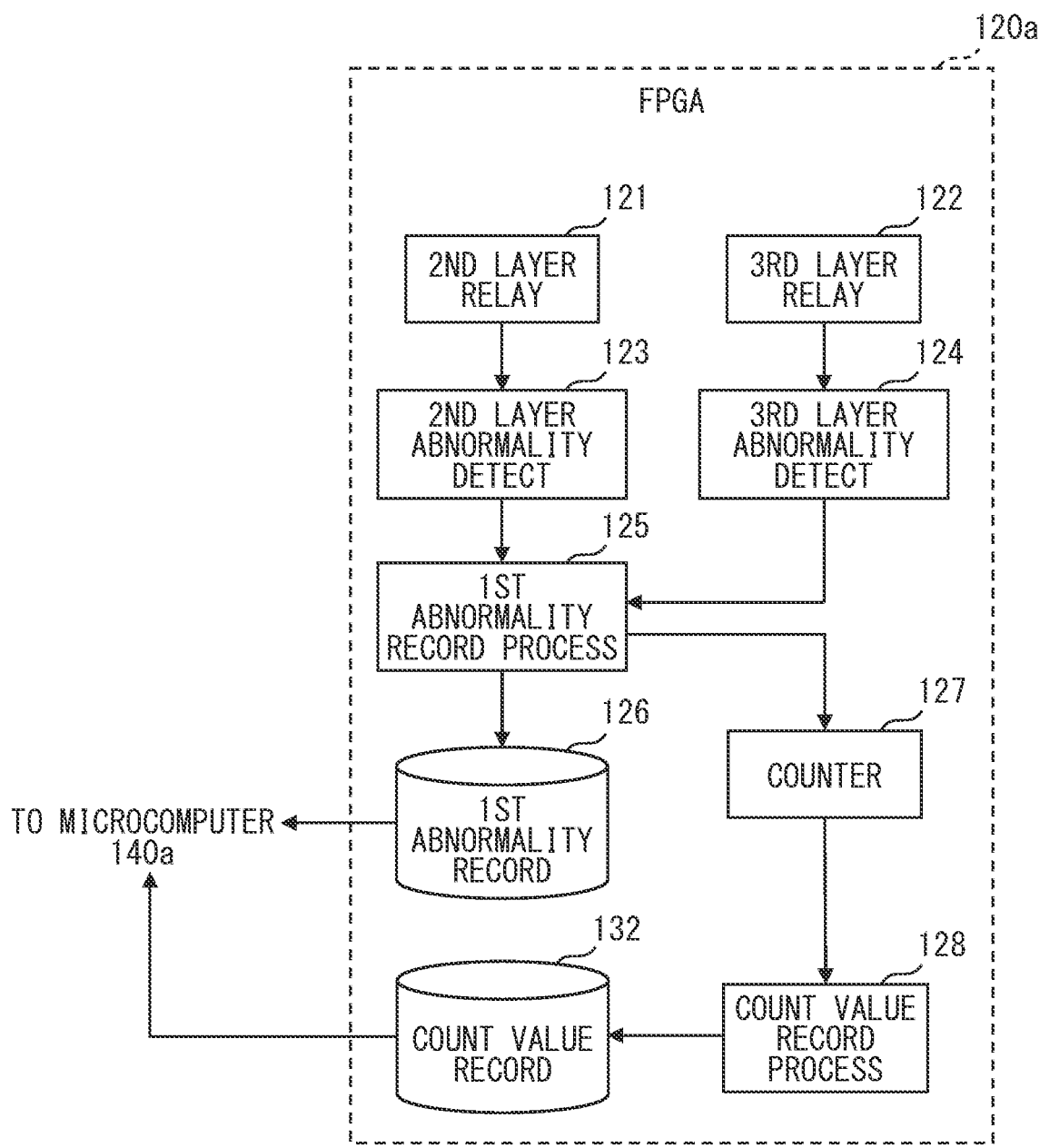
FIG. 8 is a diagram showing an example of a schematic configuration of a FPGA.

The following will describe an example of a configuration of the FPGA 120a with reference to FIG. 8. As shown in FIG. 8, the FPGA 120 includes a second layer relay section 121, a third layer relay section 122, a second layer abnormality detection section 123, a third layer abnormality detection section 124, a first abnormality recording processing section 125, a first abnormality recording section 126, a counter 127, a count value recording processing section 128, and a count value recording section 132 as functional blocks. The FPGA 120a of the second embodiment is the same as the FPGA 120 of the first embodiment except that the FPGA 120a includes the counter 127, the count value recording processing section 128, and the count value recording section 132.

The counter 127 counts the occurrence number of abnormal frames in either the second layer relay section 121 or the third layer relay section 122. The counter 127 may be triggered by detection of an abnormal frame by either the second layer abnormality detection section 123 or the third layer abnormality detection section 124. When being triggered, the counter 127 increases the count value by one. The count value recording processing section 128 records the count value counted by the counter 127 in the count value recording section 132.

For example, a volatile memory may be used as the count value recording section 132. As another example, a non-volatile memory may be used as the count value recording section 132. The count value recording section 132 may be set as a different area from the first abnormality recording processing section 125 in the same memory.

Configuration of Microcomputer 140a

Figure 9:
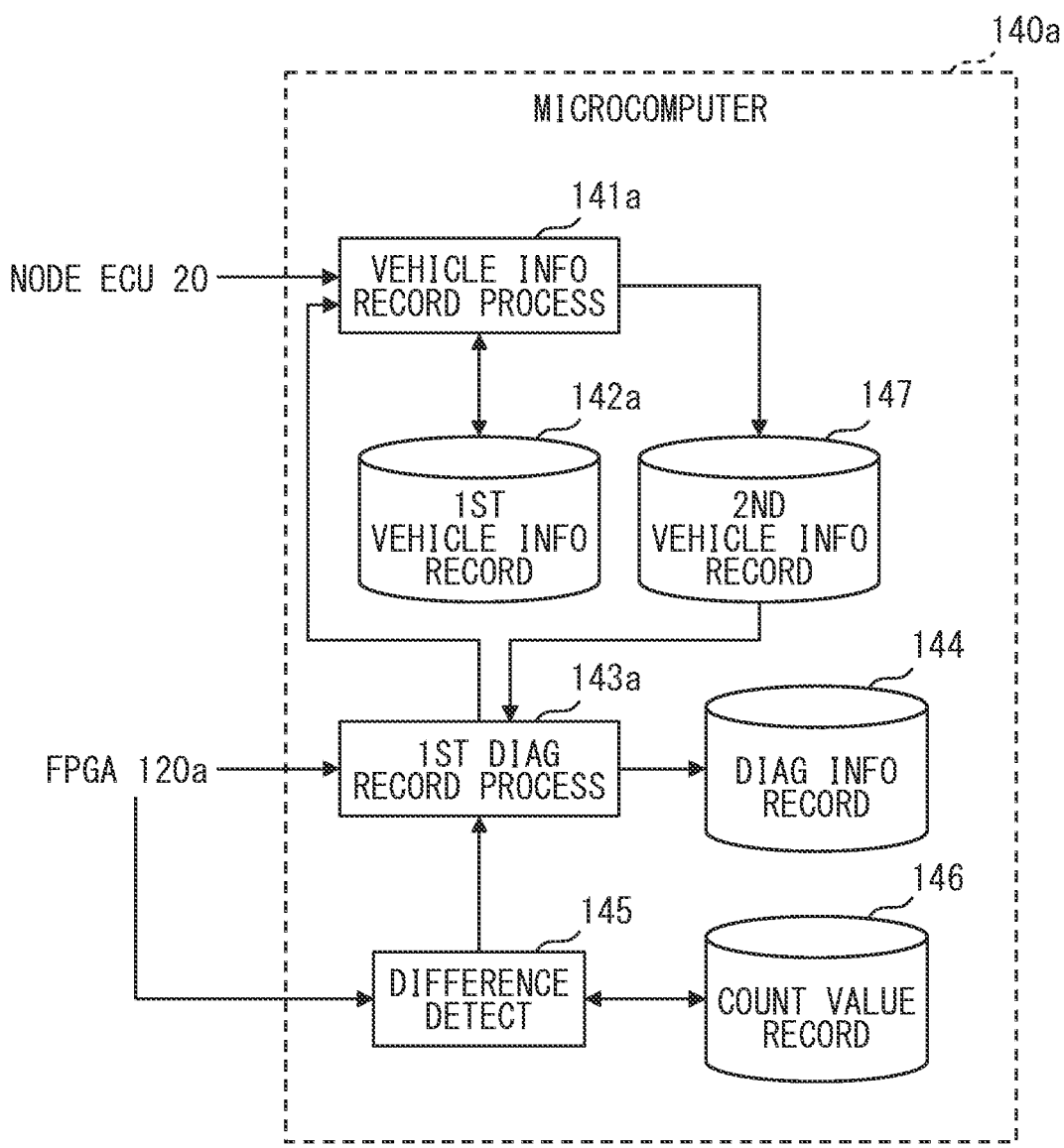
FIG. 9 is a diagram showing an example of a schematic configuration of a microcomputer.

The following will describe an example of a configuration of the microcomputer 140a with reference to FIG. 9. As shown in FIG. 9, the microcomputer 140 includes a vehicle information recording processing section 141a, a first vehicle information recording section 142a, a first diagnostic recording processing section 143a, a diagnostic information recording section 144, a difference detection section 145, a count value recording section 146, and a second vehicle information recording section 147 as functional blocks. The microcomputer 140a of the second embodiment is the same as the microcomputer 140 of the first embodiment except that the microcomputer 140a includes the vehicle information recording processing section 141a, the first vehicle information recording section 142a, the second vehicle information recording section 147, and the first diagnostic recording processing section 143a, instead of the vehicle information recording processing section 141, the vehicle information recording section 142, and the first diagnostic recording processing section 143, and further includes the difference detection section 145 and the count value recording section 146.

The difference detection section 145 periodically reads out the count value recorded in the count value recording section 132 of the FPGA 120. That is, the occurrence number of abnormal frames recorded in the count value recording section 132 is periodically read out. The term "periodically" used herein may be defined as a predetermined time interval that is properly set. The difference detection section 145 records the count value, which is read out, in the count value recording section 146. For example, a volatile memory may be used as the count value recording section 146. As another example, a non-volatile memory may be used as the count value recording section 146. Each time the count value is read out from the FPGA, the difference detection section 145 detects a difference between the immediately readout count value and the previous readout count value recorded in the count value recording section 146.

The vehicle information recording processing section 141a is the same as the vehicle information recording processing section 141 of the first embodiment, except that a part of the recording process for recording the vehicle information, which is sequentially transmitted from the end ECU 20, is different from that of the first embodiment. The vehicle information recording processing section 141a records, in the first vehicle information recording section 142a, only one record of the latest vehicle information among the multiple records of vehicle information sequentially transmitted from the end ECU 20. That is, only the latest one vehicle information record is left in the first vehicle information recording section 142a. For example, a volatile memory may be used as the first vehicle information recording section 142a. As another example, a non-volatile memory may be used as the first vehicle information recording section 142a.

When the difference detection section 145 detects one or more differences, the vehicle information recording processing section 141a records, in the second vehicle information recording section 147, the vehicle information corresponding to the number of times detected as the difference. For example, when the difference detection section 145 detects one or more differences, the vehicle information recording processing section 141a may store, in the second vehicle information recording section 147, the corresponding difference number of latest vehicle information records, which are read out from the first vehicle information recording section 142a. The second vehicle information recording section 147 corresponds to the vehicle information recording section.

For example, when the detected difference is one record, the latest one record of vehicle information is recorded in the second vehicle information recording section 147. For example, when the detected difference is three records, three records of same latest vehicle information are recorded in the second vehicle information recording section 147. As a result, the number of vehicle information records correspond to the occurrence number of detected abnormal frames, and it is possible to record the vehicle information close to the occurrence time of the abnormal frame. Each time the difference detection section 145 detects one or more differences, the vehicle information recording processing section 141a may store, in the second vehicle information recording section 147, the corresponding difference number of latest vehicle information records in chronological order, which are read out from the first vehicle information recording section 142a. For example, a volatile memory may be used as the second vehicle information recording section 147. As another example, a non-volatile memory may be used as the second vehicle information recording section 147.

By shortening the cycle of periodically detecting the count value by the difference detection section 145, detection of two or more differences can be reduced, and the vehicle information, which is more close to the detected occurrence time of abnormal frame, can be transmitted from the end ECU 20 and recorded in the second vehicle information recording section 147. Therefore, the cycle at which the difference detection section 145 periodically detects the count value may be properly set such that multiple times of detection can be performed in average one trip. The one trip referred to here is the period from turn-on of the power switch to turn-off of the power switch.

The first diagnostic recording processing section 143a reads out the abnormal frame, which is recorded in the first abnormality recording section 126 of the FPGA 120, when the second layer relay section 121 and the third layer relay section 122 are not in the data relaying states. As an example, the first diagnostic recording processing section 143a may read out the abnormal frame when the power switch of the own vehicle is turned off. More specifically, the first diagnostic recording processing section 143a may read out the abnormal frame when the ignition of vehicle is turned off. When the ignition is in off state, the vehicle-mounted relay device 10a may receive power from the backup power supply so that the first diagnostic recording processing section 143a can execute the abnormal frame readout process.

Then, the first diagnostic recording processing section 143a records the readout abnormal frame together with the vehicle information, which is recorded in the second vehicle information recording section 147, as the diagnostic information in the diagnostic information recording section 144. The first diagnostic recording processing section 143a may correlate the vehicle information recorded in the second vehicle information recording section 147 with the abnormal frame recorded in the first abnormality recording section 126 in chronological order of recording. Then, the vehicle information correlated with the abnormal frame may be recorded in the diagnostic information recording section 144 as the diagnostic information.

Process Related to Diagnostic Recording Executed by Microcomputer 140a

Figure 10:
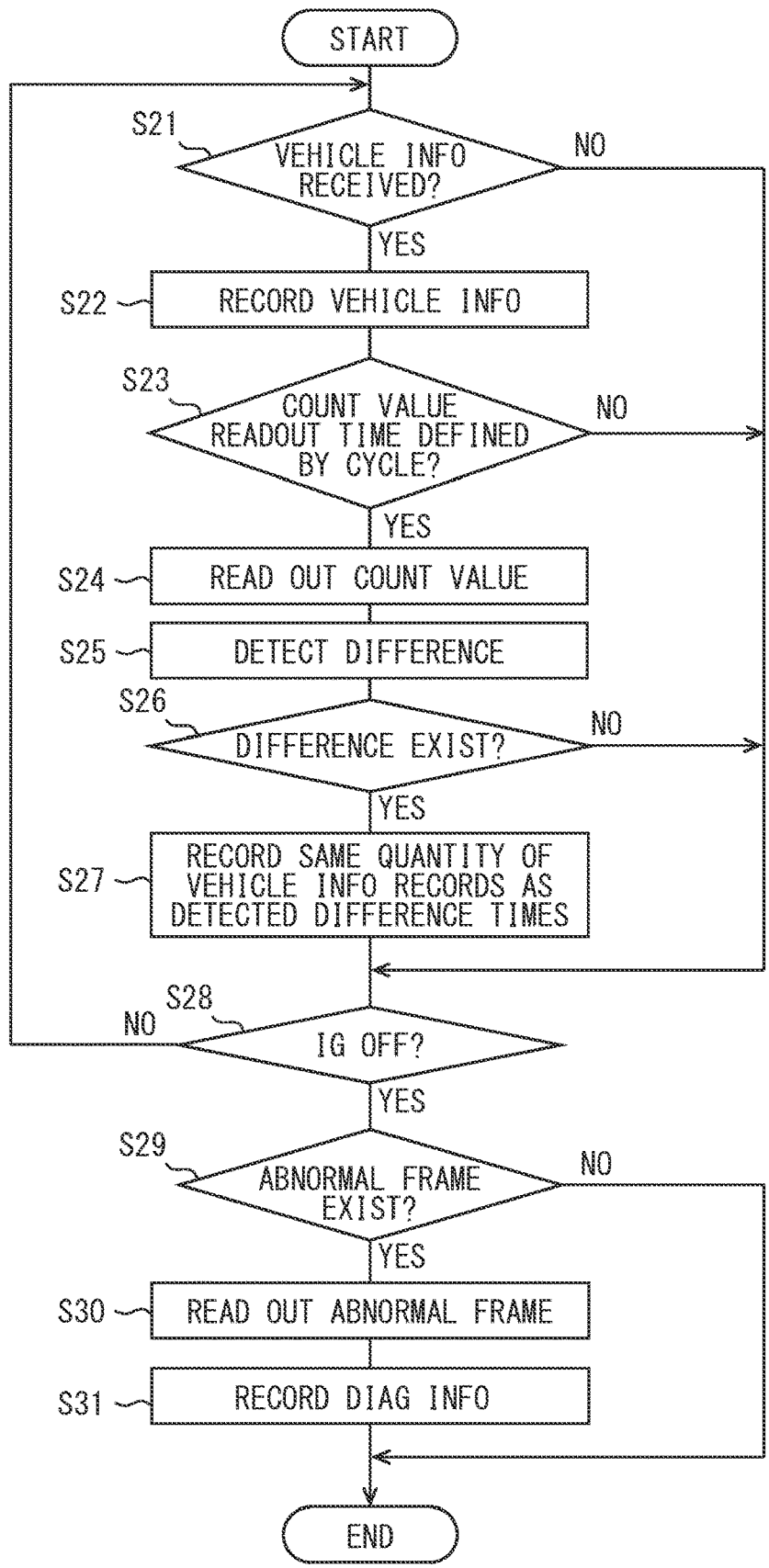
FIG. 10 is a flowchart showing an exemplary flow of diagnostic record related process executed by the microcomputer.

The following will describe an example of a diagnostic record related process executed by the microcomputer 140a with reference to FIG. 10. The flowchart of FIG. 10 may be configured to start when the power switch of the vehicle is turned on, similar to the flowchart shown in FIG. 5. That is, the process may start when the ignition of vehicle is turned on.

In S21, when the microcomputer determines that the vehicle information is transmitted from the end ECU 20 (YES in S21), the process proceeds to S22. When the vehicle information is not transmitted from the end ECU 20 (NO in S21), the process proceeds to S28. In S22, the vehicle information recording processing section 141 records the vehicle information sequentially transmitted from the end ECU 20 in the first vehicle information recording section 142a. The vehicle information currently recorded in the first vehicle information recording section 142a may be overwritten each time new vehicle-related information is recorded, and only the latest vehicle information is kept in the first vehicle information recording section 142a.

In S23, when the current time is determined as the readout timing of count value (YES in S23), the process proceeds to S24. The count value is readout from the count value recording section 132 of the FPGA 120 at predetermined readout cycle. When the current time is not the readout timing determined based on the readout cycle (NO in S23), the process proceeds to S28.

In S24, the difference detection section 145 reads out the count value, which is recorded in the count value recording section 132. In S25, the difference detection section 145 calculates the difference between the previously readout count value the currently readout count value. In S26, when the count value difference calculated in S25 is equal to or greater than one, that is, when there exists a difference (YES in S26), the process proceeds to S27. When the count value different calculated in S25 is zero, that is, when there is no difference (NO in S26), the process proceeds to S28.

In S27, the vehicle information recording processing section 141a stores, in the second vehicle information recording section 147, one or more latest vehicle information records, which are read out from the first vehicle information recording section 142a. The number of one or more latest vehicle information records read out from the first vehicle information recording section 142a is set corresponding to the count value different detected in S25. In S28, when the ignition is turned off (YES in S28), the process proceeds to S29. In S28, when the ignition is not turned off (NO in S28), the process returns to S21 and repeats the subsequent process.

In S29, when an abnormal frame is recorded in the first abnormality recording section 126 (YES in S9), the process proceeds to S30. In S29, when no abnormal frame is recorded in the first abnormality recording section 126 (NO in S29), the diagnostic recording related process is terminated.

In S30, the first diagnostic recording processing section 143a reads out the abnormal frame recorded in the first abnormality recording section 126. In S31, the first diagnostic recording processing section 143a correlates the abnormal frame read out in S30 with the vehicle information recorded in the second vehicle information recording section 147 in chronological order of recording. Then, the vehicle information correlated with the abnormal frame is recorded in the diagnostic information recording section 144 as the diagnostic information. Then, the process is ended.

After the vehicle information recording processing section 141a records the vehicle information as the diagnostic information, the vehicle information may be deleted from the second vehicle information recording section 147.

Overview of Second Embodiment

According to the second embodiment, the vehicle-mounted relay device 10a includes the second layer L2 and the third layer L3, which are configured by the hardware circuit of FPGA 120a. Thus, an occurrence of communication delay and heat generation can be suppressed. The microcomputer 140a only needs to execute the process of the fourth layer L4 and upper layers, it is possible to use a less sophisticated microcomputer 140a.

Further, according to the second embodiment, it is possible to record, in the microcomputer 140a, the diagnostic information in which the vehicle information transmitted from another electronic control unit is correlated with the abnormal frame. As a result, similar to the first embodiment, an occurrence of communication delay and heat generation can be suppressed. Further, while enabling reading out of diagnostic information about abnormal frame detected during the relay operation executed by the hardware circuit, the development cost can be suppressed.

In addition, according to the second embodiment, the abnormal frame recorded in the FPGA 120a is read out while the second layer relay section 121 and the third layer relay section 122 are not in the relaying operation states. Thus, it is possible to prevent the recording order of the abnormal frames from becoming incorrect in the first abnormality recording section 126. In the second embodiment, the microcomputer records the vehicle information corresponding to the difference in the periodically readout number of occurrences of the abnormal frames in the second vehicle information recording section 147. Thus, the number of vehicle information records, which correspond to the number of times the abnormal frames are detected, can be recorded, and the vehicle information that is more close to the occurrence time of abnormal frame can be recorded. As described above, although the abnormal frames recorded in the FPGA 120a are read out while the relaying operation of the second layer relay section 121 and the third layer relay section 122 are in relay operation stop states, the vehicle information corresponding to each detected abnormal frame can be recorded as the diagnostic information.

Third Embodiment

In the above-described embodiment, the microcomputer 140, 140a correlates the detected abnormal frame with the vehicle information. The present disclosure is not limited to this configuration. For example, instead of the microcomputer, the hardware circuit may correlate the detected abnormal frame with the vehicle information (hereinafter described as third embodiment). The following will describe a detailed example of the third embodiment with reference to the accompanying drawings. The vehicle-mounted communication system 1 of the third embodiment is the same as the vehicle-mounted communication system 1 of the first embodiment, except that a vehicle-mounted relay device 10b is included instead of the vehicle-mounted relay device 10 of the first embodiment.

Configuration of Vehicle-Mounted Relay Device 10b

Figure 11:
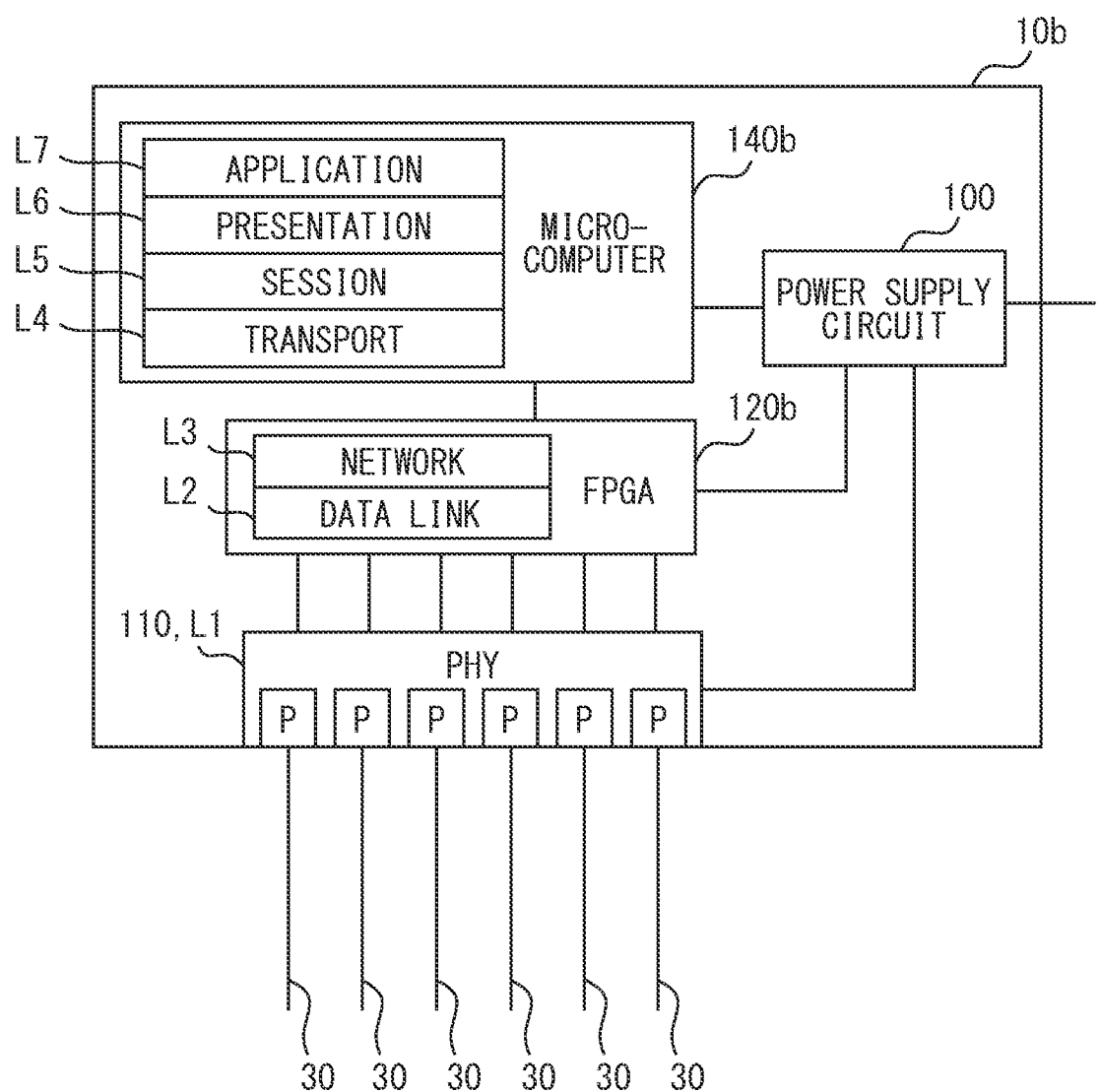
FIG. 11 is a diagram showing an example of a schematic configuration of a vehicle-mounted relay device.

The following will describe a configuration of the vehicle-mounted relay device 10b with reference to FIG. 11. As shown in FIG. 11, the vehicle-mounted relay device 10b includes a power supply circuit 100, a PHY 110, an FPGA 120b, and a microcomputer 140b. In the vehicle-related communication system 1 of the third embodiment, the vehicle-mounted relay device 10b is the same as the vehicle-mounted relay device 10 of the first embodiment, except that the FPGA 120b and the microcomputer 140b are provided instead of the FPGA 120 and the microcomputer 140 of the first embodiment.

Configuration of FPGA 120b

Figure 12:
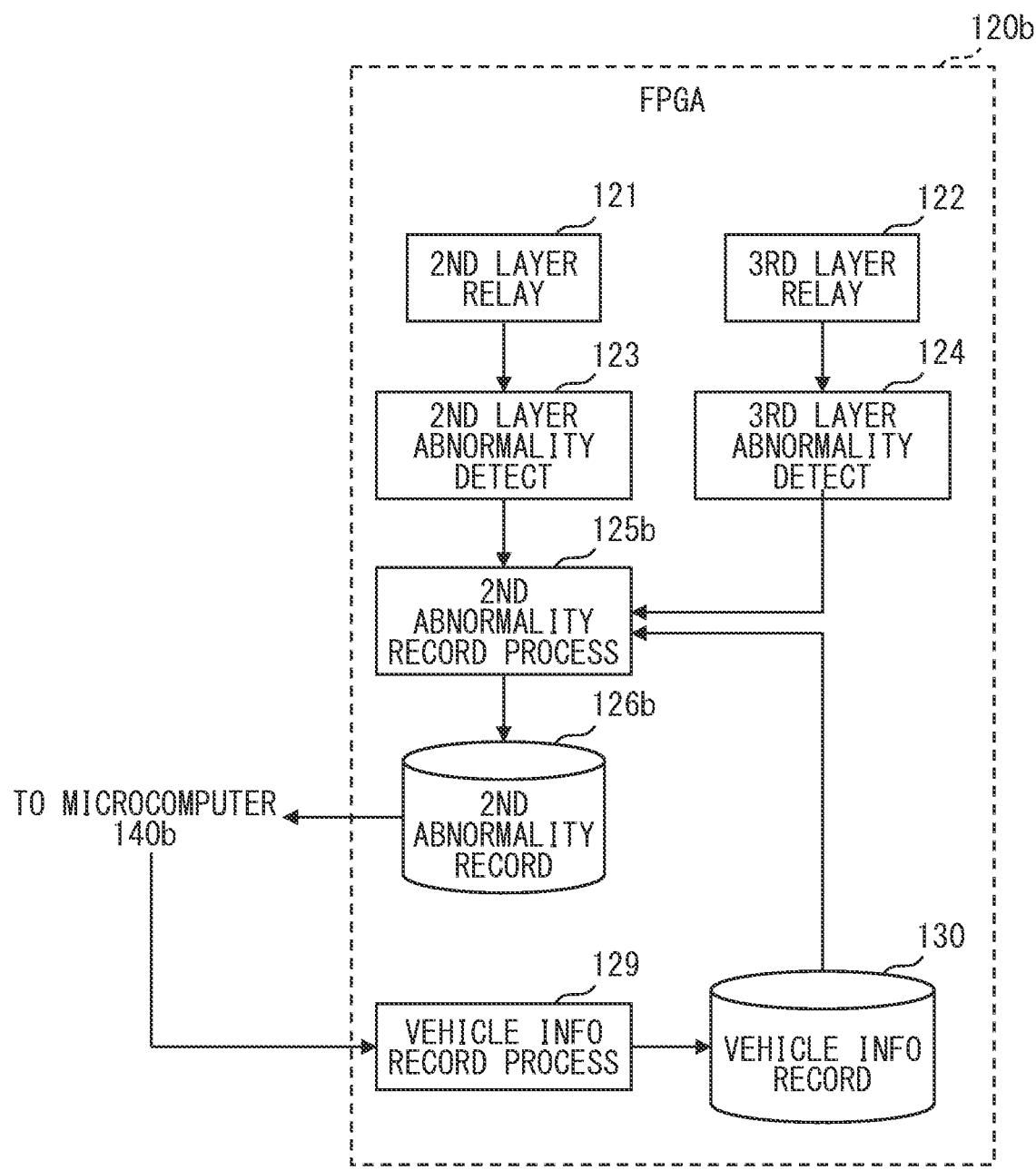
FIG. 12 is a diagram showing an example of a schematic configuration of a FPGA.

The following will describe an example of a configuration of the FPGA 120b with reference to FIG. 12. As shown in FIG. 8, the FPGA 120b includes a second layer relay section 121, a third layer relay section 122, a second layer abnormality detection section 123, a third layer abnormality detection section 124, a second abnormality recording processing section 125b, a second abnormality recording section 126b, a vehicle information recording processing section 129, and a vehicle information recording section 130 as functional blocks. The FPGA 120b of the third embodiment is the same as the FPGA 120 of the first embodiment except that the FPGA 120b includes the second abnormality recording processing section 125b and the second abnormality recording section 126b instead of the first abnormality recording processing section 125 and the first abnormality recording section 126, and further includes the vehicle information recording processing section 129 and the vehicle information recording section 130.

The vehicle information recording processing section 129 records, in the vehicle information recording section 130, the above-described vehicle information, which is sequentially transmitted from the end ECU 20 via the microcomputer 140b. That is, the vehicle information sequentially transmitted from other devices mounted on the subject vehicle via the microcomputer 140b are recorded in the vehicle information recording section 130. The FPGA 120b does not directly acquire and record the vehicle information transmitted from the end ECU 20. This is because, the microcomputer 140b can determine the content of frame as vehicle information by specifying the content of received communication frame while the FPGA has no ability to determine the content of frame as the vehicle information.

For example, a volatile memory may be used as the vehicle information recording section 130. As another example, a non-volatile memory may be used as the vehicle information recording section 130. Each time the vehicle information is transmitted from the microcomputer, the vehicle information recording processing section 129 may record only one latest vehicle information in the vehicle information recording section 130 by overwriting the currently recorded vehicle information.

When the second layer abnormality detection section 123 or the third layer abnormality detection section 124 detects an abnormal frame, the second abnormality recording processing section 125b records, in the second abnormality recording section 126b, the abnormal frame and the vehicle information by correlating one with one another. The vehicle information is transmitted from a vehicle information transmission section 148 of the microcomputer 140b, which will be described later, at the detection time of the abnormal frame. As an example, when the second layer abnormality detection section 123 or the third layer abnormality detection section 124 detects an abnormal frame, the detected abnormal frame is correlated with the latest vehicle information recorded in the vehicle information recording section 130. Then the abnormal frame correlated with the latest vehicle information is recorded in the second abnormality recording section 126b. With this configuration, it becomes possible to correlate the vehicle information, which is more close to the detection time of the abnormal frame, with the detected abnormal frame. For example, as the second abnormality recording section 126b, a volatile memory or a non-volatile memory may be used.

Configuration of Microcomputer 140b

Figure 13:
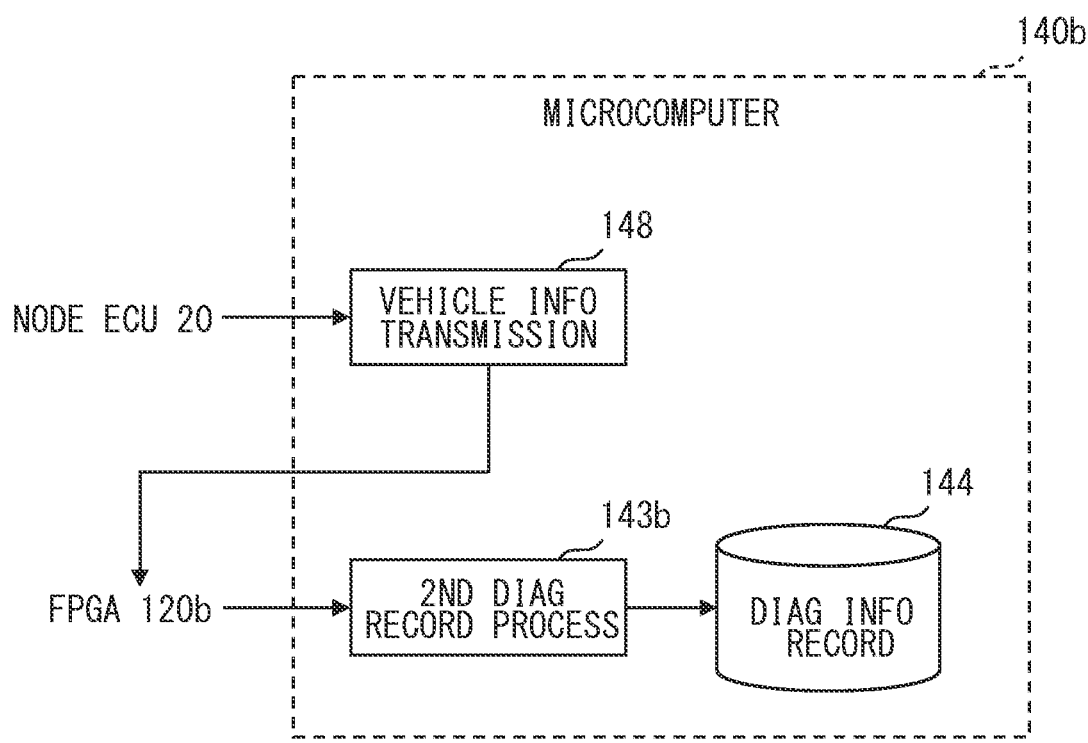
FIG. 13 is a diagram showing an example of a schematic configuration of a microcomputer.

The following will describe an example of a configuration of the microcomputer 140b with reference to FIG. 13. As shown in FIG. 13, the microcomputer 140b includes a vehicle information transmission section 148, a second diagnostic recording processing section 143b, and a diagnostic information recording section 144 as functional blocks. The microcomputer 140b of the third embodiment is the same as the microcomputer 140 of the first embodiment except that the microcomputer 140b does not include the vehicle information recording processing section 141 and the vehicle information recording section 142, includes the second diagnostic recording processing section 143b instead of the first diagnostic recording processing section 143, and further includes the vehicle information transmission section 148.

The vehicle information transmission section 148 transmits, to the FPGA 120b, the vehicle information sequentially transmitted from the end ECU 20.

The second diagnostic recording processing section 143b reads out, from the second abnormality recording section 126b of the FPGA 120b, the abnormal frame and the vehicle information correlated with one another. Then, the second diagnostic recording processing section 143b stores the readout abnormal frame and the correlated vehicle information in the diagnostic information recording section 144 as the diagnostic information. The second diagnostic recording processing section 143b may periodically read out the abnormal frame and the correlated vehicle information from the FPGA 120b, and may read out the abnormal frame and the correlated vehicle information from the FPGA 120 in response to a predetermined event occurrence. One example of the predetermined event is turning off the power switch, such as turning off the ignition.

The second abnormality recording processing section 125b of the FPGA 120b may delete the abnormal frame and correlated vehicle information from the second abnormality recording section 126b after the abnormal frame and the correlated vehicle information are read out by the microcomputer 140b.

Process Related to Diagnostic Recording Executed by FPGA 120b

Figure 14:
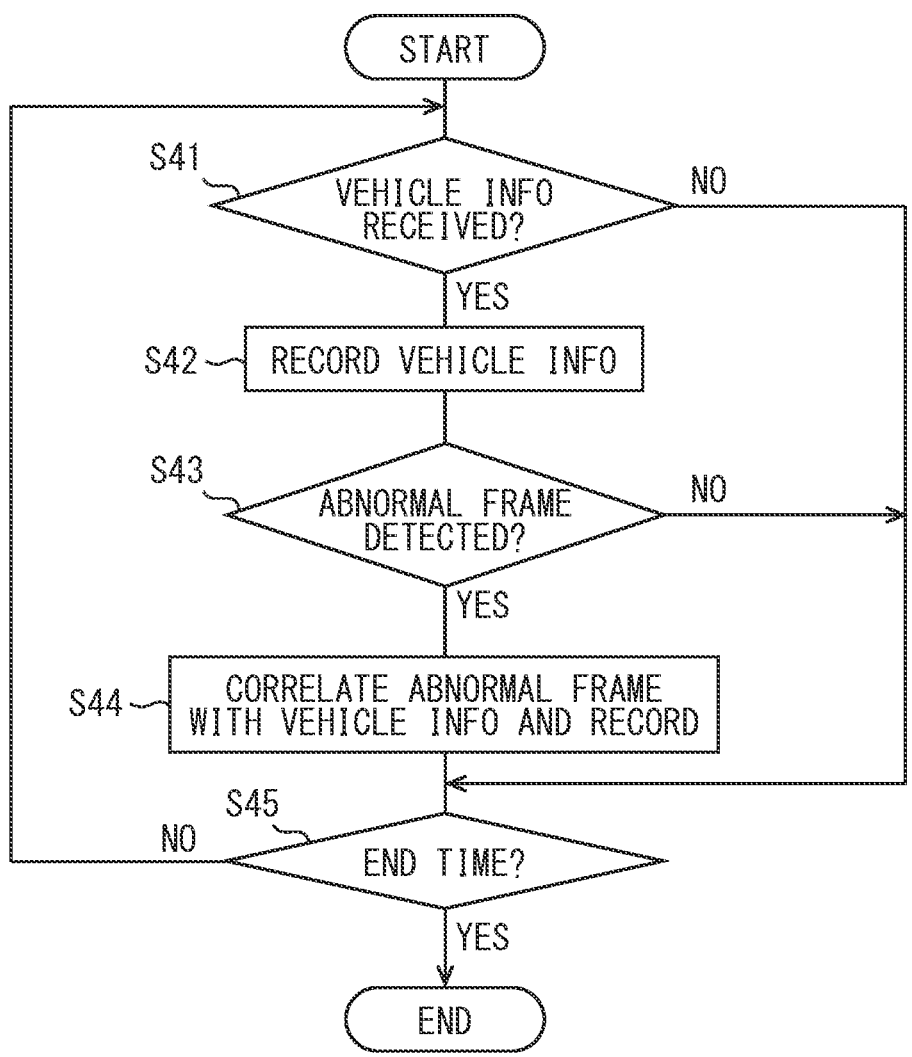
FIG. 14 is a flowchart showing an exemplary flow of diagnostic record related process executed by the FPGA.

The following will describe an example of a diagnostic record related process executed by the FPGA 120b with reference to FIG. 14. The flowchart of FIG. 14 may be configured to be started when, for example, the power switch is turned on. That is, the process may start when the ignition of vehicle is turned on.

In S41, when the FPGA determines that the vehicle information is transmitted from the microcomputer 140b (YES in S41), the process proceeds to S42. When the FPGA determines that vehicle information is not transmitted from the microcomputer 140b (NO in S41), the process proceeds to S45. In S42, the vehicle information recording processing section 129 records the vehicle information transmitted from the microcomputer 140b in the vehicle information recording section 130. The vehicle information currently recorded in the vehicle information recording section 130 may be overwritten each time new vehicle-related information is recorded, and only the latest vehicle information is kept in the vehicle information recording section 142.

In S43, when an abnormal frame is detected by the second layer abnormality detection section 123 or the third layer abnormality detection section 124 (YES in S43), the process proceeds to S44. When the second layer abnormality detection section 123 nor the third layer abnormality detection section 124 does not detect an abnormal frame (NO in S43), the process proceeds to S45.

In S44, the second abnormality recording processing section 125b correlates the abnormal frame detected in S43 with the latest vehicle information recorded in the vehicle information recording section 130, and records the correlated abnormal frame and vehicle information in the second abnormality recording section 126b.

In S45, when the process determines the current time is an end timing of the process related to diagnostic recording (YES in S45), the process related to diagnostic recording is ended. For example, the process related to diagnostic recording may be ended when the power switch of vehicle is turned off. More specifically, the process related to diagnostic recording may be ended when the ignition of vehicle is turned off. When the current time is not the end timing of the process related to diagnostic recording (NO in S45), the process returns to S41 and repeats the subsequent process.

Overview of Third Embodiment

According to the third embodiment, the vehicle-mounted relay device 10b includes the second layer L2 and the third layer L3, which are configured by the hardware circuit of FPGA 120b. Thus, an occurrence of communication delay and heat generation can be suppressed. The microcomputer 140b only needs to execute the process of the fourth layer L4 and upper layers, it is possible to use a less sophisticated microcomputer 140b.

Further, according to the third embodiment, it is possible to record, in the microcomputer 140b, the diagnostic information in which the vehicle information transmitted from another electronic control unit at the detection time of abnormal frame is correlated with the abnormal frame. As a result, an occurrence of communication delay and heat generation can be suppressed. Further, while enabling reading out of diagnostic information about abnormal frame detected during the relay operation executed by the hardware circuit, the development cost can be suppressed.

Fourth Embodiment

In the above-described embodiments, the PHY 110 is provided separately from the FPGA 120, 120a, and 120b. The present disclosure is not limited to this configuration. For example, the FPGA 120, 120a, and 120b may have the function of PHY 110.

Fifth Embodiment

The hardware circuit may be provided by a hardware circuit equipped with a processor such as a CPU.

Sixth Embodiment

In the first embodiment, the software unit, which executes the functions of the fourth layer L4 to the seventh layer L7, is configured separately from the hardware circuit. The present disclosure is not limited to this configuration. For example, software unit that executes the functions of the fourth layer L4 to the seventh layer L7 may be mounted on the hardware circuit as one component (hereinafter referred to as sixth embodiment). The following will describe a detailed example of the sixth embodiment with reference to the accompanying drawings.

The vehicle-mounted communication system 1 of the third embodiment is the same as the vehicle-mounted communication system 1 of the first embodiment, except that the vehicle-mounted relay device 10c is included instead of the vehicle-mounted relay device 10 of the first embodiment.

Configuration of Vehicle-Mounted Relay Device 10c

Figure 15:
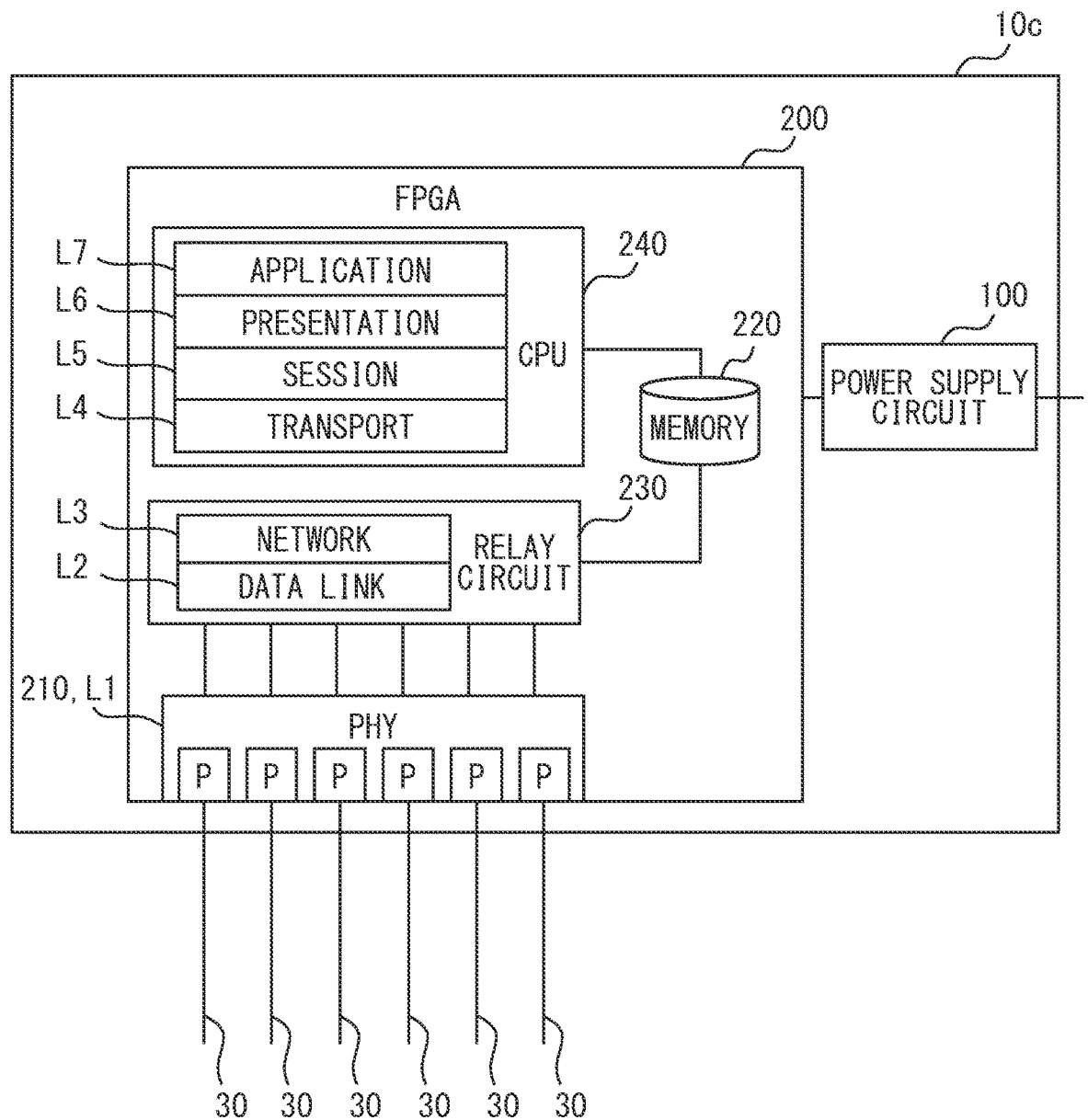
FIG. 15 is a diagram showing an example of a schematic configuration of a vehicle-mounted relay device.

The following will describe a configuration of the vehicle-mounted relay device 10 with reference to FIG. 15. As shown in FIG. 15, the vehicle-mounted relay device 10c includes a power supply circuit 100 and a FPGA 200.

The power supply circuit 100 is similar to the power supply circuit of the first embodiment, and supplies power to the FPGA 200. The FPGA 200 is a type of integrated electronic circuit, such as a well-known PLD. The FPGA 200 corresponds to a hardware circuit. The FPGA 200 is programmed to perform functions of the first layer L1 to the third layer L3 in the OSI reference model.

The FPGA 200 converts, by using the function of the first layer L1, a signal supplied from the end ECU 20 via the cable 30 into a signal that can be processed by the FPGA 200. The FPGA 200 converts, by using the function of the first layer L1, the signal supplied from the FPGA 200 into an electric signal that can be transmitted through the cable 30. The FPGA 200 performs signal conversion, frame coding, serial-parallel conversion, signal waveform conversion, and the like. The FPGA 200 relays the communications in the same VLAN 40, 50 by the function of the second layer L2. The FPGA 200 relays the communication between different networks by the function of the third layer L3.

Configuration of FPGA 200

The following will describe an example of a configuration of the FPGA 200 with reference to FIG. 15. As shown in FIG. 15, the FPGA 200 includes a PHY 210, a memory 220, a relay circuit 230, and a CPU 240.

The PHY 210 may be the same as the PHY 110 of the first embodiment except that the PHY is included in the FPGA 200. The PHY 210 corresponds to the physical layer (that is, the first layer) L1 in the OSI reference model. The PHY 210 corresponds to a hardware unit.

The memory 220 is shared by the relay circuit 230 and the CPU 240, and is also referred to as a common memory. The CPU 240 can read out information, from the memory 220, information recorded by the relay circuit 230 in the memory and information recorded by the CPU 240 in the memory. For example, the memory 220 may be provided by a volatile memory. As another example, the memory 220 may be provided by a RAM. As another example, the memory 220 may be provided by a register. As another example, the memory 220 may be provided by a non-volatile memory. Hereinafter, a case where a RAM is used as the memory 220 will be described as an example.

The relay circuit 230 can relay a communication. The relay circuit 230 is a logic circuit that performs communication relay function of the second layer L2 and the third layer L3 with hardware without using software. The relay circuit 230 may be referred to as a logic circuit designed by a hardware language. The relay circuit 230 corresponds to a hardware unit.

The CPU 240 is a processor that operates software to perform corresponding function of software. The CPU 240 performs various processes by executing control programs. The control program may be configured to be stored in the non-volatile memory of FPGA 200. The CPU 240 implements the functions of the fourth layer L4, the fifth layer L5, the sixth layer L6, and the seventh layer L7 by software process. The CPU 240 corresponds to a software unit.

Configuration of Memory 220

Figure 16:
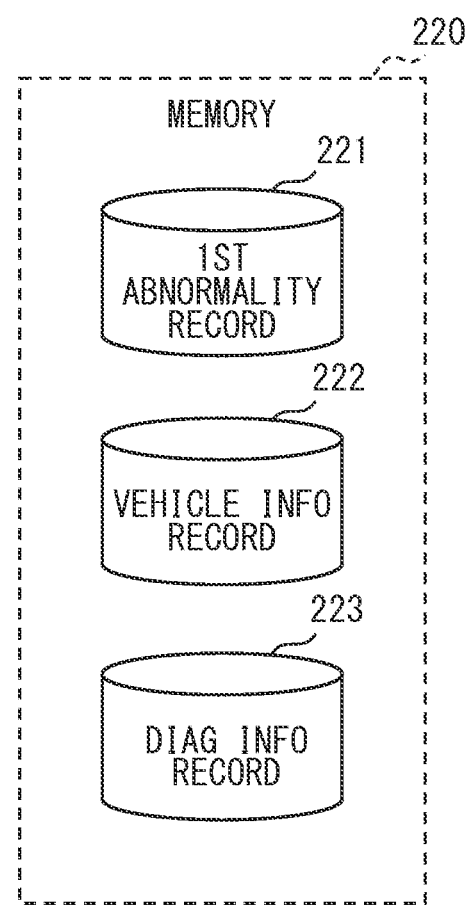
FIG. 16 is a diagram showing an example of a schematic configuration of a memory.

The following will describe an example of a configuration of the memory 220 with reference to FIG. 16. As shown in FIG. 16, the memory 220 includes a first abnormality recording section 221, a vehicle information recording section 222, and a diagnostic information recording section 223 as functional blocks.

A first abnormality recording processing section 235, which will be described later, stores, in the first abnormality recording section 221, an abnormal frame. A vehicle information recording processing section 241, which will be described later, stores vehicle information in the vehicle information recording section 222. A first diagnostic recording processing section 242, which will be described later, stores, in the diagnostic information recording section 223, diagnostic information including the vehicle information and the abnormal frame.

Configuration of Relay Circuit 230

Figure 17:
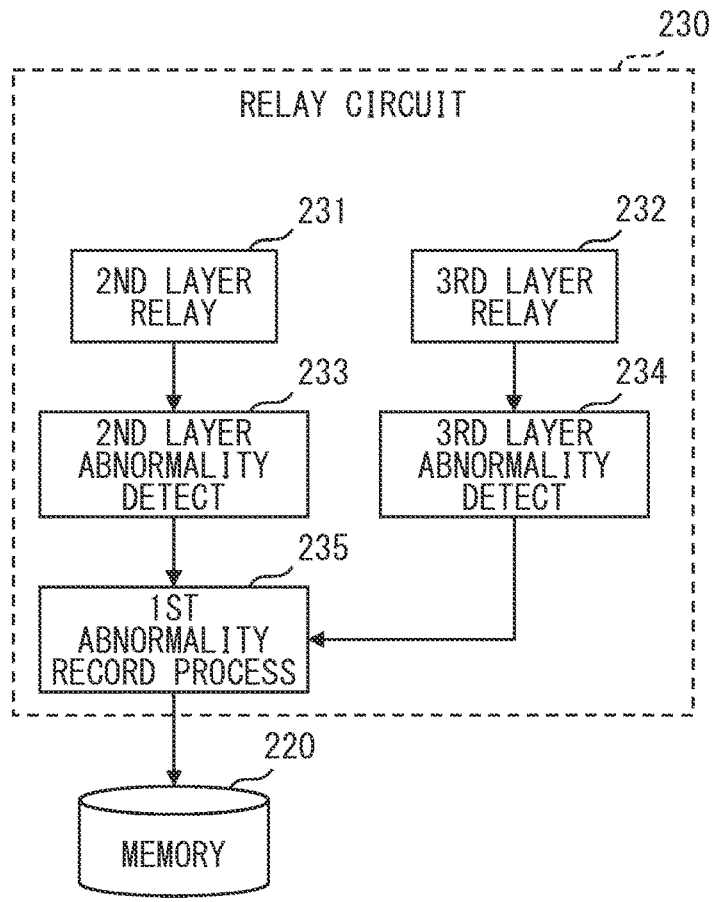
FIG. 17 is a diagram showing an example of a schematic configuration of a relay circuit.

The following will describe an example of a configuration of the relay circuit 230 with reference to FIG. 17. As shown in FIG. 17, the relay circuit 230 includes a second layer relay section 231, a third layer relay section 232, a second layer abnormality detection section 233, a third layer abnormality detection section 234, and a first abnormality recording processing section 235 as functional blocks.

The second layer relay section 231 relays the communication within the same VLAN 40, 50 in the same manner as the second layer relay section 121 of the first embodiment. The third layer relay section 232 relays the communication between different networks in the same manner as the third layer relay section 122 of the first embodiment. The second layer abnormality detection section 233 detects an abnormal frame in the signal relayed by the second layer relay section 231 in the same manner as the second layer abnormality detection section 123 of the first embodiment. The third layer abnormality detection section 234 detects an abnormal frame in the signal relayed by the third layer relay section 232 in the same manner as the third layer abnormality detection section 124 of the first embodiment.

When the second layer abnormality detection section 233 detects an abnormal frame, the first abnormality recording processing section 235 stores the detected abnormal frame in the first abnormality recording section 221 of the memory 220 similar to the first abnormality recording processing section 125 of the first embodiment. When the third layer abnormality detection section 234 detects an abnormal frame, the first abnormality recording processing section 235 records the detected abnormal frame in the first abnormality recording section 221 of the memory 220 similar to the first abnormality recording processing section 125 of the first embodiment.

Configuration of CPU 240

Figure 18:
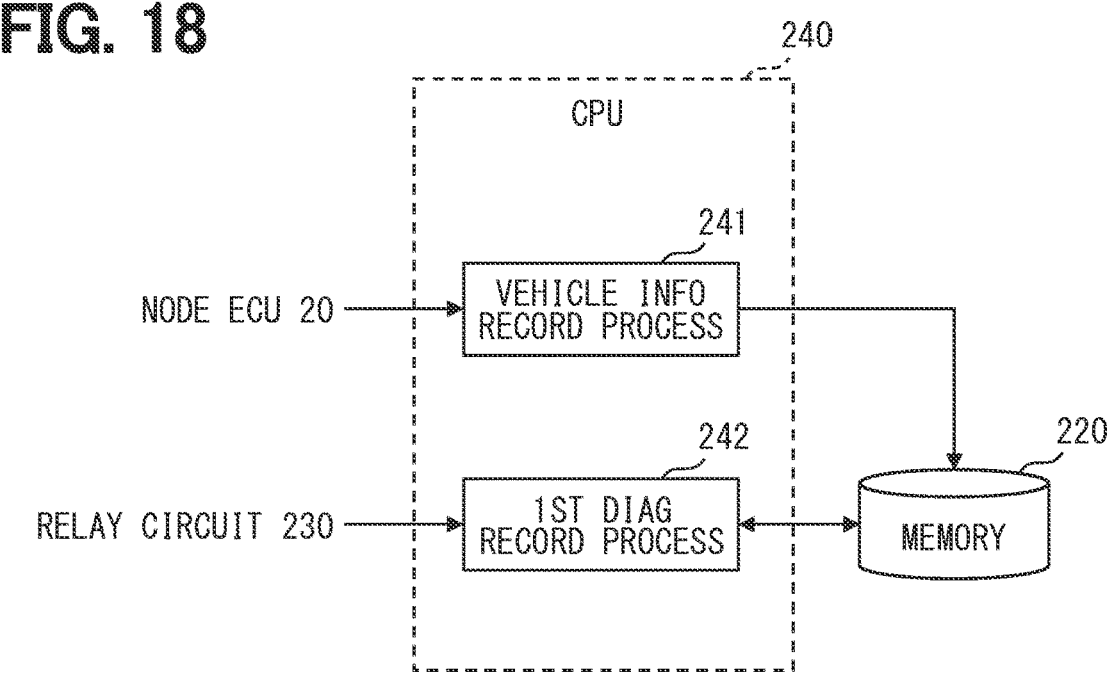
FIG. 18 is a diagram showing an example of a schematic configuration of a CPU.

The following will describe an example of a configuration of the CPU 240 with reference to FIG. 18. As shown in FIG. 18, the CPU 240 includes a vehicle information recording processing section 241 and a first diagnostic recording processing section 242 as functional blocks.

Similar to the vehicle information recording processing section 141 of the first embodiment, the vehicle information recording processing section 241 records, in the vehicle information recording section 222 of the memory 220, the vehicle information sequentially transmitted from the end ECU 20. The vehicle information recording processing section 241 may be configured to record only one latest vehicle information in the vehicle information recording section 222.

The first diagnostic recording processing section 242 periodically reads out the abnormal frame recorded in the first abnormality recording section 221 of the memory 220. Then, the first diagnostic recording processing section 242 records the readout abnormal frame together with the vehicle information, which is recorded in the vehicle information recording section 222 of the memory 220 at the detection time of the abnormal frame, as the diagnostic information in the diagnostic information recording section 223 of the memory 220. When correlating the abnormal frame with the vehicle information, the first diagnostic recording processing section 242 may correlate the latest information recorded in the first abnormality recording section 221 with the latest information recorded in the vehicle information recording section 222 in order. As an example, a predetermined number of most recent abnormal frames and a predetermined number of most recent vehicle information records may be read out, and the abnormal frames may be combined with the vehicle information records from the most recent one in order. The predetermined number referred to here may be singular or plural.

Figure 5:
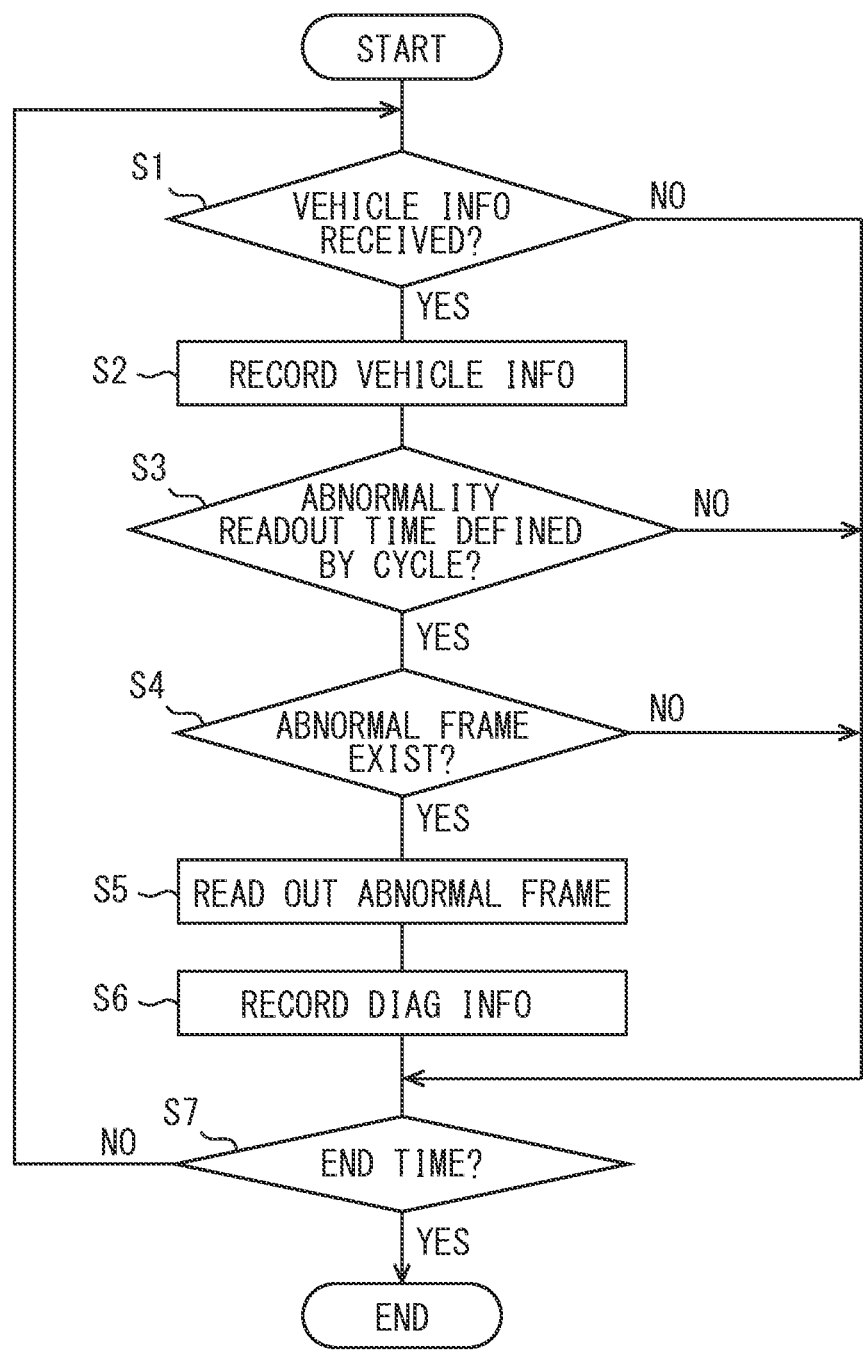
FIG. 5 is a flowchart showing an exemplary flow of diagnostic record related process executed by the microcomputer.

The process related to the diagnostic recording by the CPU 240 may be performed in the same manner as the diagnostic recording related process shown in the flowchart of FIG. 5.

Overview of Sixth Embodiment

According to the sixth embodiment, the vehicle-mounted relay device 10c includes the second layer L2 and the third layer L3, which are implemented by the operation of hardware circuit. Thus, an occurrence of communication delay and heat generation can be suppressed. The CPU 240 only needs to execute the process of the fourth layer L4 and upper layers, it is possible to use a less sophisticated CPU 240.

According to the configuration of the sixth embodiment, the CPU 240 reads out the abnormal frame, which is recorded in the first abnormality recording section 221 by the relay circuit 230, and also reads out the vehicle information, which is recorded in the vehicle information recording section 222 by the CPU 240. Then, the CPU 240 stores correlates the abnormal frame with the vehicle information, and stores, as the diagnostic information, in the diagnostic information recording section 223. The diagnostic information stored in the diagnostic information recording section 223 can be read out by the CPU 240. As described above, an abnormal frame is detected by the operation of the relay circuit 230, which is the hardware unit, and the vehicle information is recorded by the operation of the CPU 240, which is the software unit. Thus, the CPU 240, which corresponds to the software unit, can read out the diagnostic information, which includes the vehicle information transmitted from other electronic control units and the abnormal frame correlated with the vehicle information. Since the function of application layer is executed by the CPU 240, the diagnostic information recorded in the diagnostic information recording section 223 can be read by a diagnostic tool. Since the diagnostic information can be read without installing the application layer in the hardware unit, it is possible to easily change the specification of the application layer and reduce the development cost.

Seventh Embodiment

In the second embodiment, the software unit, which executes the functions of the fourth layer L4 to the seventh layer L7, is configured separately from the hardware circuit. The present disclosure is not limited to this configuration. For example, software unit that executes the functions of the fourth layer L4 to the seventh layer L7 may be mounted on the hardware circuit as one component (hereinafter referred to as seventh embodiment). The following will describe a detailed example of the seventh embodiment with reference to the accompanying drawings.

In the sixth embodiment, the CPU 240 periodically reads out the abnormal frame from the memory 220. In this configuration, the readout timing of the abnormal frame from the memory 220 may overlap with the detection timing of abnormal frame similar to the first embodiment. In this case, the reading order of the abnormal frames from the first abnormality recording section 221 may become incorrect. The seventh embodiment can solve this potential difficulty.

The vehicle-mounted communication system 1$d$ of the seventh embodiment is the same as the vehicle-mounted communication system 1$a$ of the second embodiment, except that a vehicle-mounted relay device 10$d$ is included instead of the vehicle-mounted relay device 10$a$ of the second embodiment.

Configuration of Vehicle-Mounted Relay Device 10$d$

Figure 19:
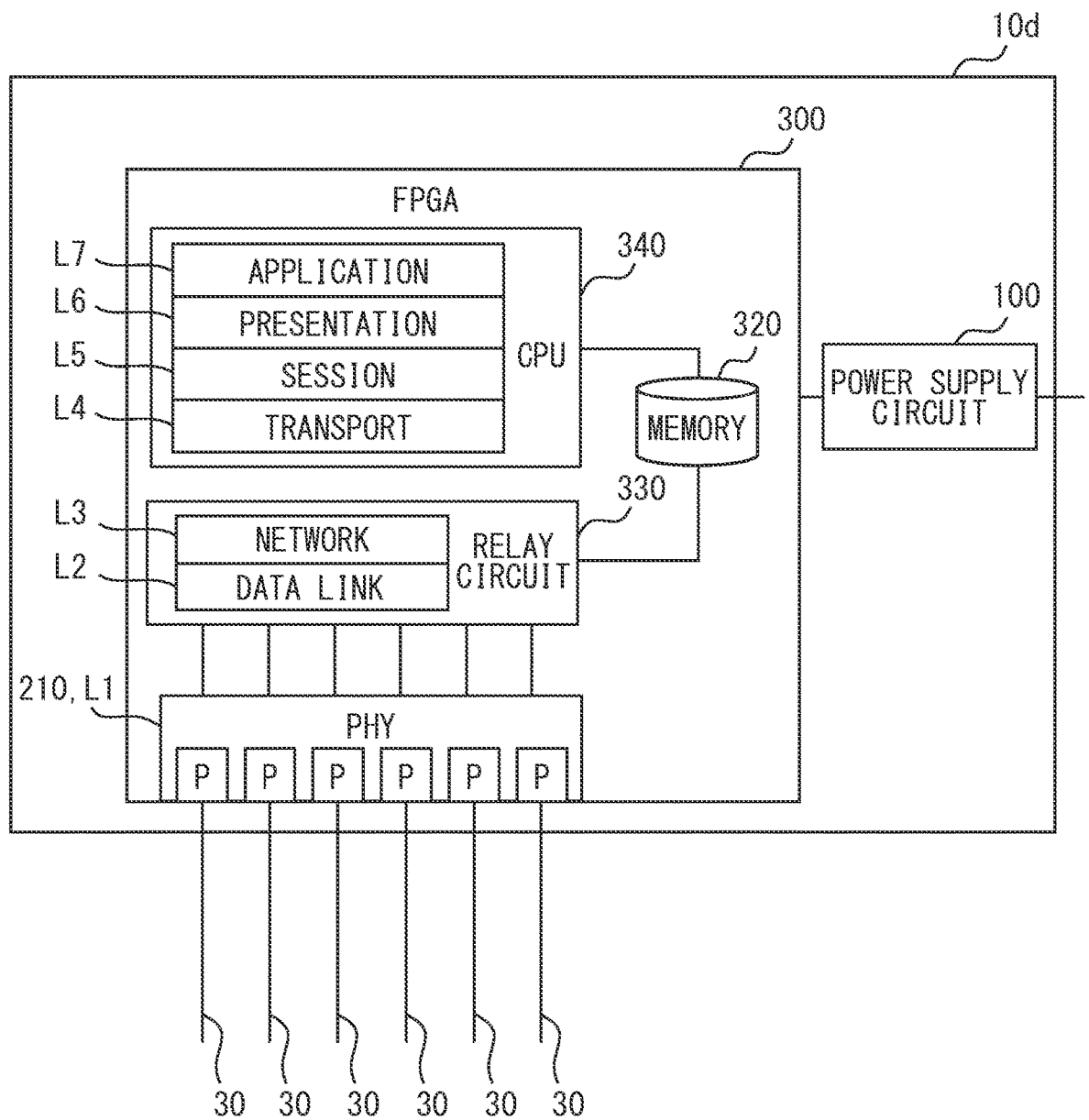
FIG. 19 is a diagram showing an example of a schematic configuration of a vehicle-mounted relay device.

The following will describe a configuration of the vehicle-mounted relay device 10$d$ with reference to FIG. 19. As shown in FIG. 19, the vehicle-mounted relay device 10$d$ includes a power supply circuit 100 and a FPGA 300.

The power supply circuit 100 is similar to the power supply circuit of the sixth embodiment, and supplies power to the FPGA 300. The FPGA 300 is the same as the FPGA 200 of the sixth embodiment except that a part of process is different from that of the sixth embodiment.

Configuration of FPGA 300

The following will describe an example of a configuration of the FPGA 300 with reference to FIG. 19. As shown in FIG. 19, the FPGA 300 includes a PHY 210, a memory 320, a relay circuit 330, and a CPU 340.

The memory 320 is similar to the memory 220 of the sixth embodiment except that some functional blocks are different from those of the sixth embodiment. The relay circuit 330 and the CPU 340 can read out information, from the memory 320, information recorded by the relay circuit 330 in the memory and information recorded by the CPU 340 in the memory.

The relay circuit 330 is the same as the relay circuit 230 of the sixth embodiment except that some functional blocks are different from those of the sixth embodiment. The relay circuit 330 is a logic circuit that performs communication relay function of the second layer L2 and the third layer L3 with hardware without using software. The relay circuit 330 may be referred to as a logic circuit designed by a hardware language. The relay circuit 330 corresponds to a hardware unit. The CPU 340 is a processor similar to the CPU 240 of the sixth embodiment, except that some functional blocks are different from those of eighth embodiment. The CPU 340 corresponds to a software unit.

Configuration of Memory 320

Figure 20:
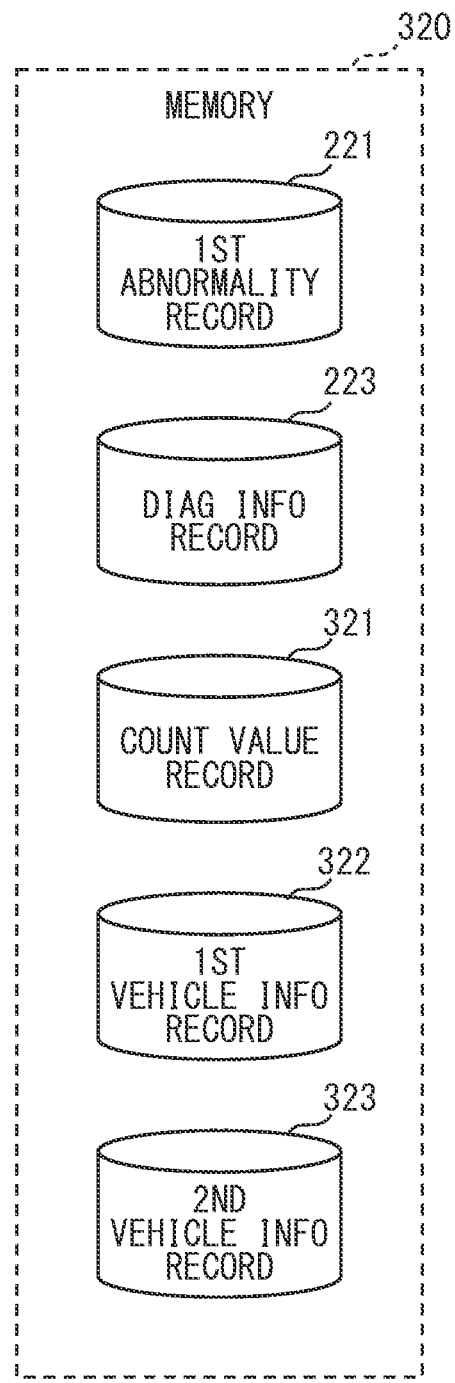
FIG. 20 is a diagram showing an example of a schematic configuration of a memory.

The following will describe an example of a configuration of the memory 320 with reference to FIG. 20. As shown in FIG. 20, the memory 320 includes a first abnormality recording section 221, a diagnostic information recording section 223, a count value recording section 321, a first vehicle information recording section 322, and a second vehicle information recording section 323 as functional blocks. The memory 320 of the present embodiment is same as the memory 220 of the sixth embodiment except that the memory 320 further includes the count value recording section 321, and includes the first vehicle information recording section 322 and the second vehicle information recording section 323 instead of the vehicle information recording section 222.

A count value recording processing section 332, which will be described later, counts the number of occurrence times of abnormal frames in either the second layer relay section 231 or the third layer relay section 232 as a count value, and the count value recording section 321 records the count value counted by the count value recording processing section. A vehicle information recording processing section 342, which will be described later, records, in the first vehicle information recording section 322, only one record of the latest vehicle information among the multiple records of vehicle information sequentially transmitted from the end ECU 20. The vehicle information recording processing section 342 reads out, from the first vehicle information recording section 322, predetermined number of latest vehicle information records, and stores the readout vehicle information records in the second vehicle information recording section 323. The predetermined number of latest vehicle information records corresponds to the difference value detected by a difference detection section 341, which will be described later.

Configuration of Relay Circuit 330

Figure 21:
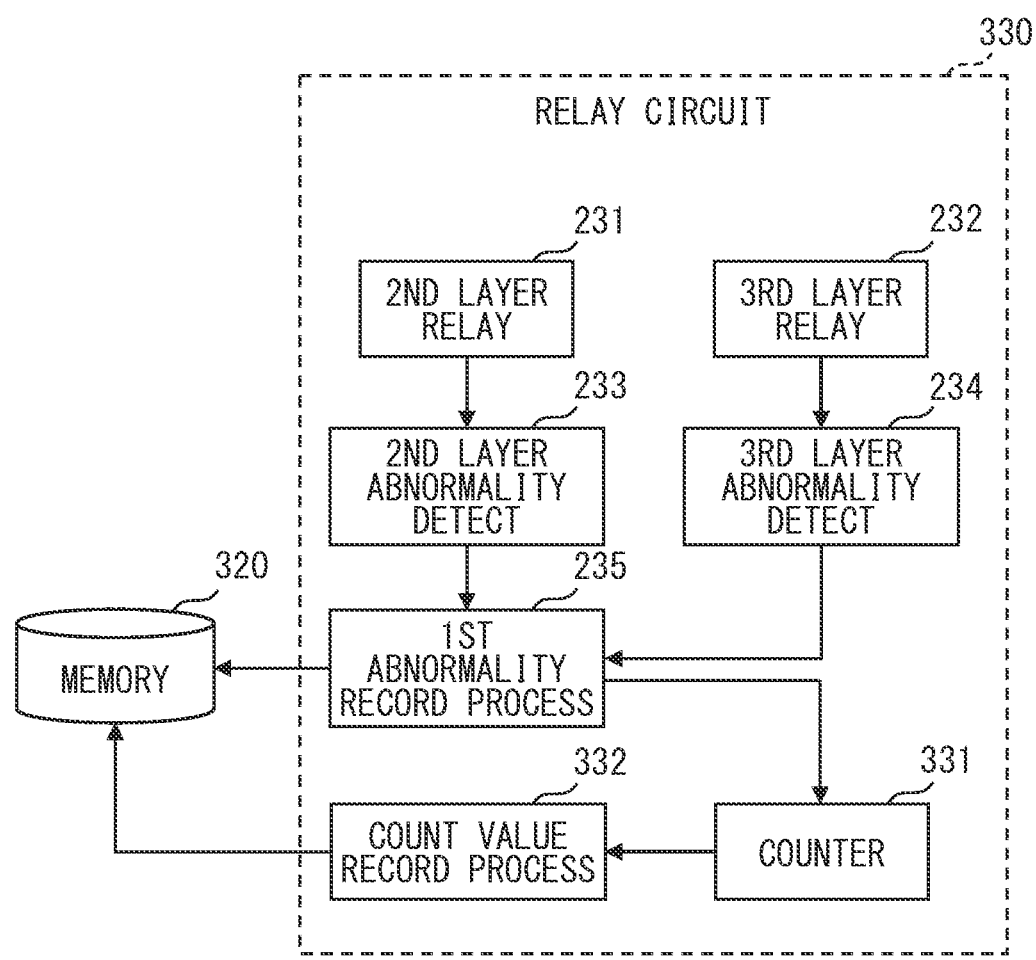
FIG. 21 is a diagram showing an example of a schematic configuration of a relay circuit.

The following will describe an example of a configuration of the relay circuit 330 with reference to FIG. 21. As shown in FIG. 21, the relay circuit 330 includes a second layer relay section 231, a third layer relay section 232, a second layer abnormality detection section 233, a third layer abnormality detection section 234, a first abnormality recording processing section 235, a counter 331, and a count value recording processing section 332 as functional blocks. The first abnormality recording processing section 235 of the present embodiment is the same as the first abnormality recording processing section 235 of the sixth embodiment, except that the first abnormality recording processing section 235 of the present embodiment records the abnormal frame in the memory 320.

Similar to the counter 127 of the second embodiment, the counter 331 counts the occurrence number of abnormal frames in either the second layer relay section 231 or the third layer relay section 232. The count value recording processing section 332 records the count value counted by the counter 331 in the count value recording section 321 of the memory 320.

Configuration of CPU 340

Figure 22:
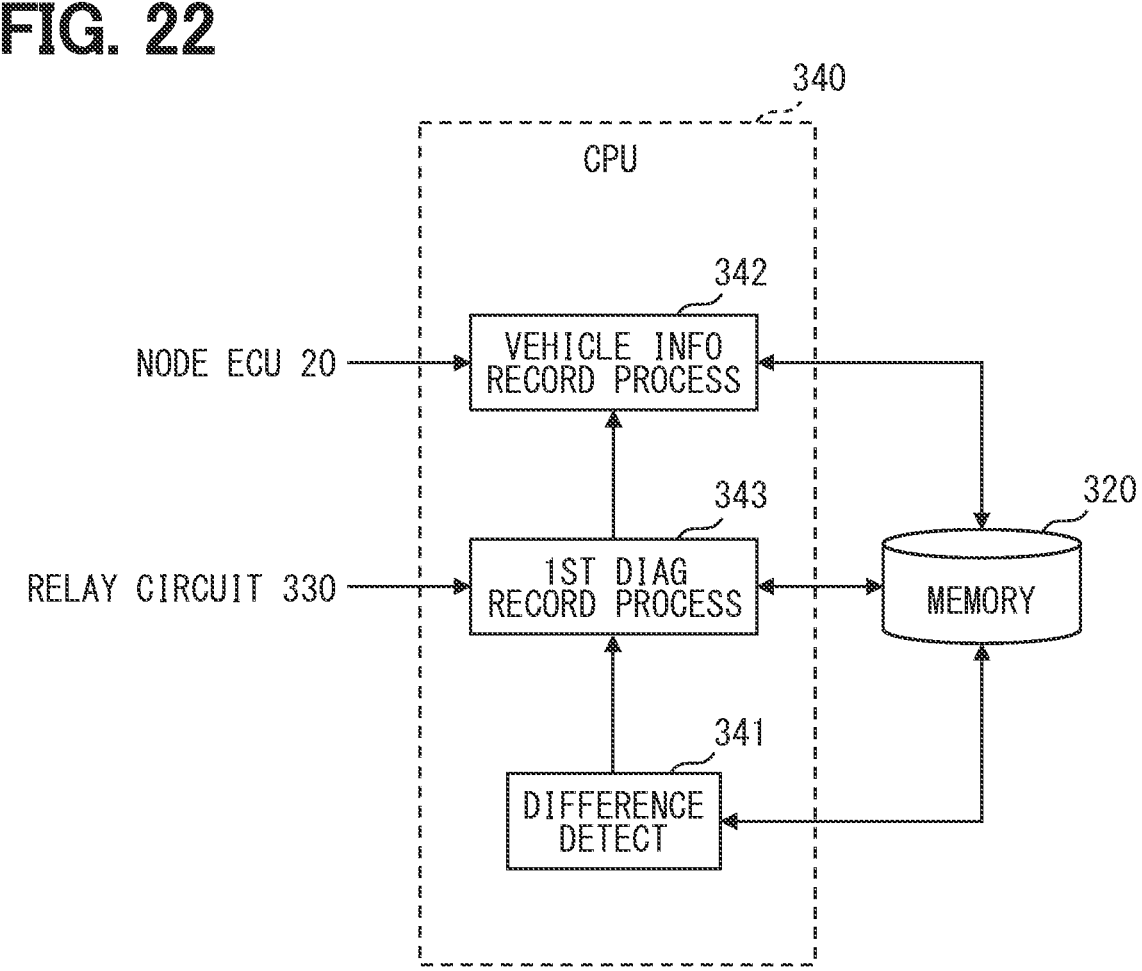
FIG. 22 is a diagram showing an example of a schematic configuration of a CPU.

The following will describe an example of a configuration of the CPU 340 with reference to FIG. 22. As shown in FIG.

22, the CPU 340 includes a difference detection section 341, a vehicle information recording processing section 342, and a first diagnostic recording processing section 343 as functional blocks.

The difference detection section 341 periodically reads out the count value recorded in the count value recording section 321 of the memory 320. That is, the occurrence number of abnormal frames recorded in the count value recording section 321 is periodically read out. The term "periodically" used herein may be defined as a predetermined time interval that is properly set. The difference detection section 341 records the count value, which is read out, in the count value recording section 321. Each time the count value is read out, the difference detection section 341 detects a difference between the immediately readout count value and the previous readout count value recorded in the count value recording section 321.

The vehicle information recording processing section 342 records, in the first vehicle information recording section 322, only one record of the latest vehicle information among the multiple records of vehicle information sequentially transmitted from the end ECU 20. That is, only the latest one vehicle information record is left in the first vehicle information recording section 322.

Similar to the vehicle information recording processing section 141a of the second embodiment, when the difference detection section 341 detects one or more differences, the vehicle information recording processing section 342 of the present embodiment records, in the second vehicle information recording section 323, the vehicle information corresponding to the number of times detected as the difference. The second vehicle information recording section 323 corresponds to the vehicle information recording section. Each time the difference detection section 341 detects one or more differences, the vehicle information recording processing section 342 may store, in the second vehicle information recording section 323, the corresponding difference number of latest vehicle information records in chronological order, which are read out from the first vehicle information recording section 322.

Similar to the first diagnostic recording processing section 143a of the second embodiment, the first diagnostic recording processing section 343 of the present embodiment reads out the abnormal frame, which is recorded in the first abnormality recording section 221 of the memory 320, when the second layer relay section 231 and the third layer relay section 232 are not in the data relaying states. Similar to the first diagnostic recording processing section 143a of the second embodiment, the first diagnostic recording processing section 343 then records the readout abnormal frame together with the vehicle information, which is read out from the second vehicle information recording section 323, as the diagnostic information in the diagnostic information recording section 223.

The process related to the diagnostic recording by the CPU 340 may be performed in the same manner as the diagnostic recording related process shown in the flowchart of FIG. 10.

Overview of Seventh Embodiment

According to the seventh embodiment, the vehicle-mounted relay device 10d includes the second layer L2 and the third layer L3, which are implemented by the operation of hardware circuit. Thus, an occurrence of communication delay and heat generation can be suppressed. The CPU 340 only needs to execute the process of the fourth layer L4 and upper layers, it is possible to use a less sophisticated CPU 340.

According to the seventh embodiment, the CPU 340, which corresponds to the software unit, can read out, by executing a process, the diagnostic information in which the vehicle information transmitted from another electronic control unit is correlated with the abnormal frame. As a result, similar to the first embodiment, an occurrence of communication delay and heat generation can be suppressed. Further, while enabling reading out of diagnostic information about abnormal frame detected during the relay operation executed by the hardware circuit, the development cost can be suppressed.

In addition, according to the seventh embodiment, the abnormal frame recorded in the memory 220 is read out while the second layer relay section 231 and the third layer relay section 232 are not in the relaying operation states. Thus, when reading out the abnormal frames from the first abnormality recording section 221, it is possible to prevent the recording order of the abnormal frames from becoming incorrect in the first abnormality recording section 221. In the seventh embodiment, the microcomputer records the vehicle information corresponding to the difference in the periodically readout number of occurrences of the abnormal frames in the second vehicle information recording section 323. Thus, the number of vehicle information records, which correspond to the number of times the abnormal frames are detected, can be recorded, and the vehicle information that is more close to the occurrence time of abnormal frame can be recorded. As described above, although the abnormal frames recorded in the memory 220 are read out while the relaying operation of the second layer relay section 231 and the third layer relay section 232 are in relay operation stop states, the vehicle information corresponding to each detected abnormal frame can be recorded as the diagnostic information.

Eighth Embodiment

In the third embodiment, the software unit, which executes the functions of the fourth layer L4 to the seventh layer L7, is configured separately from the hardware circuit. The present disclosure is not limited to this configuration. For example, software unit that executes the functions of the fourth layer L4 to the seventh layer L7 may be mounted on the hardware circuit as one component (hereinafter referred to as eighth embodiment). The following will describe a detailed example of the eighth embodiment with reference to the accompanying drawings.

The vehicle-mounted communication system 1b of the third embodiment is the same as the vehicle-mounted communication system 1d of the eighth embodiment, except that a vehicle-mounted relay device 10e is included instead of the vehicle-mounted relay device 10b of the third embodiment.

Configuration of Vehicle-Mounted Relay Device 10e

Figure 23:
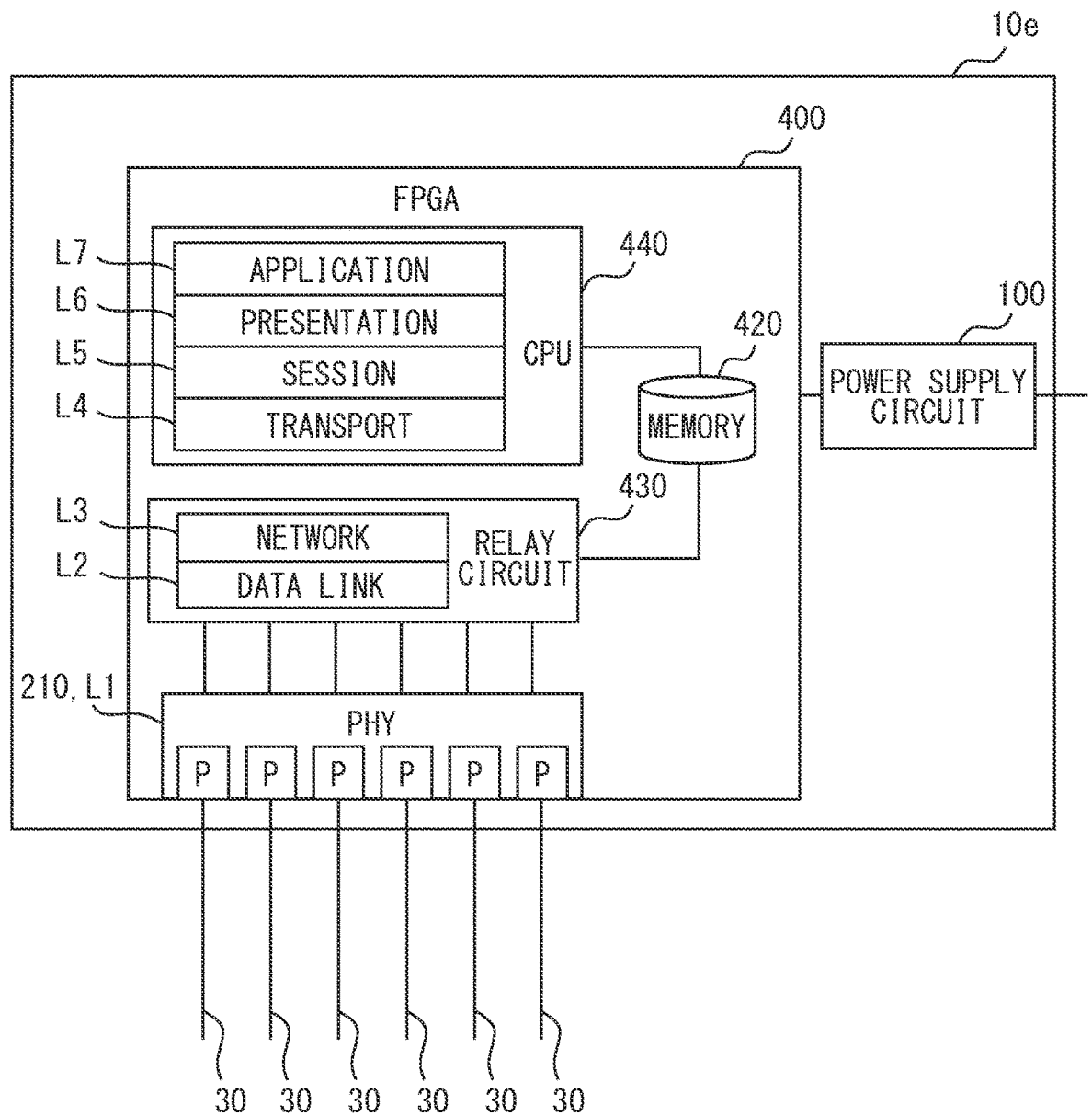
FIG. 23 is a diagram showing an example of a schematic configuration of a vehicle-mounted relay device.

The following will describe a configuration of the vehicle-mounted relay device 10e with reference to FIG. 23. As shown in FIG. 23, the vehicle-mounted relay device 10e includes a power supply circuit 100 and a FPGA 400.

The power supply circuit 100 is similar to the power supply circuit of the sixth embodiment, and supplies power to the FPGA 400. The FPGA 400 is the same as the FPGA 200 of the sixth embodiment except that a part of process is different from that of the sixth embodiment.

Configuration of FPGA 400

The following will describe an example of a configuration of the FPGA 400 with reference to FIG. 23. As shown in FIG. 23, the FPGA 400 includes a PHY 210, a memory 420, a relay circuit 430, and a CPU 440.

The memory 420 is similar to the memory 220 of the sixth embodiment except that some functional blocks are different from those of the sixth embodiment. The relay circuit 430 and the CPU 440 can read out information, from the memory 420, information recorded by the relay circuit 430 in the memory and information recorded by the CPU 440 in the memory. The relay circuit 430 is the same as the relay circuit 230 of the sixth embodiment except that some functional blocks are different from those of the sixth embodiment. The relay circuit 430 corresponds to a hardware unit. The CPU 440 is a processor similar to the CPU 240 of the sixth embodiment, except that some functional blocks are different from those of eighth embodiment. The CPU 440 corresponds to a software unit.

Configuration of Memory 420

Figure 24:
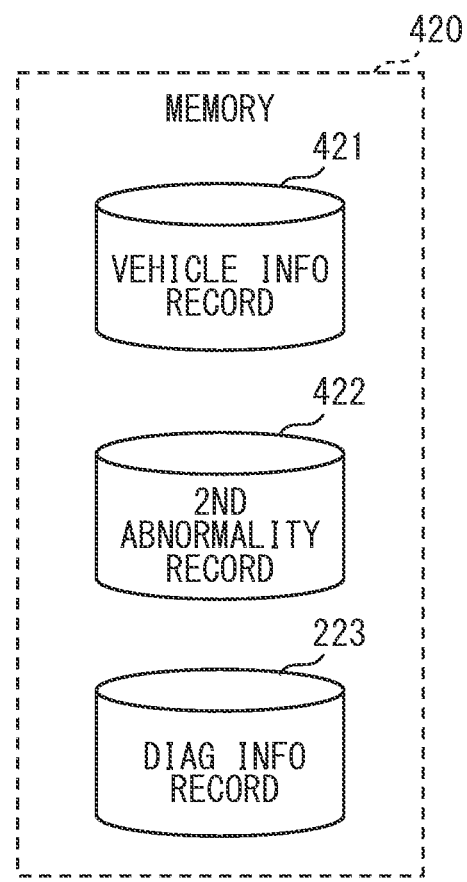
FIG. 24 is a diagram showing an example of a schematic configuration of a memory.

The following will describe an example of a configuration of the memory 420 with reference to FIG. 24. As shown in FIG. 24, the memory 420 includes a vehicle information recording section 421, a second abnormality recording section 422, and a diagnostic information recording section 223 as functional blocks. The memory 420 of the present embodiment is same as the memory 220 of the sixth embodiment except that the memory 420 includes the second abnormality recording section 422 instead of the first abnormality recording section 221, and includes the vehicle information recording section 421 instead of the vehicle information recording section 222.

A vehicle information transmission section 441, which will be described later, records, in the vehicle information recording section 421, only one record of the latest vehicle information among the multiple records of vehicle information sequentially transmitted from the end ECU 20. A second abnormality recording processing section 431, which will be described later, stores, in the second abnormality recording section 422, an abnormal frame and vehicle information correlated with one another. A second diagnostic recording processing section 442, which will be described later, stores, in the diagnostic information recording section 223, diagnostic information including the vehicle information and the abnormal frame correlated with one another.

Configuration of Relay Circuit 430

Figure 25:
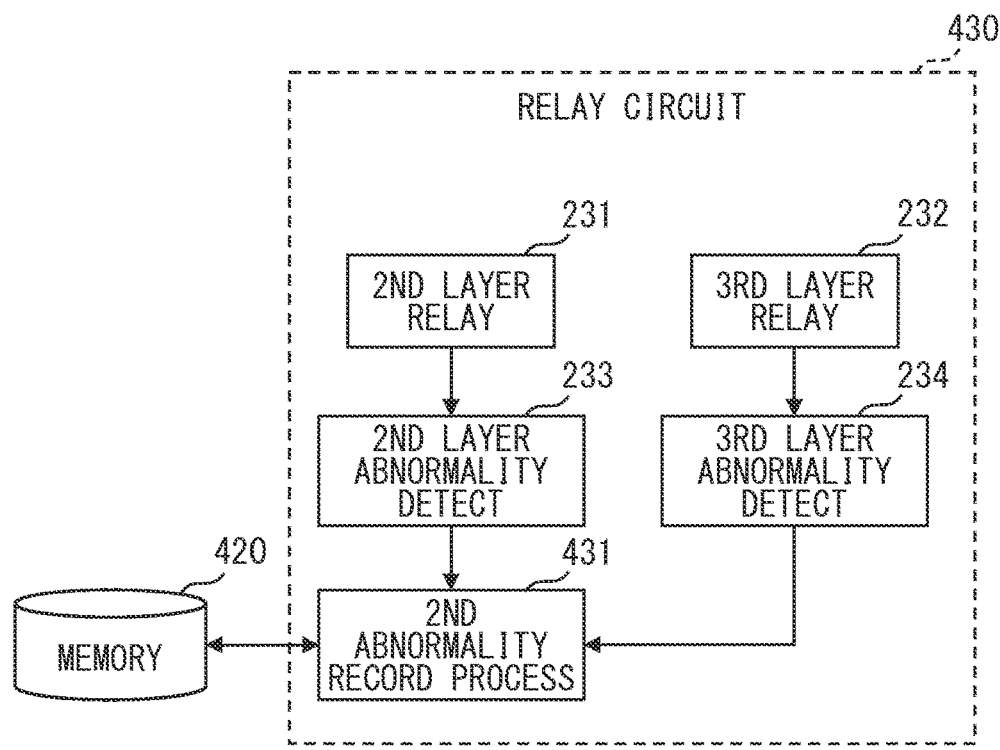
FIG. 25 is a diagram showing an example of a schematic configuration of a relay circuit.

The following will describe an example of a configuration of the relay circuit 430 with reference to FIG. 25. As shown in FIG. 25, the relay circuit 430 includes a second layer relay section 231, a third layer relay section 232, a second layer abnormality detection section 233, a third layer abnormality detection section 234, and a second abnormality recording processing section 431 as functional blocks.

When the second layer abnormality detection section 233 or the third layer abnormality detection section 234 detects an abnormal frame, the second abnormality recording processing section 431 records, in the second abnormality recording section 422, the abnormal frame and the vehicle information by correlating one with one another. The vehicle information is transmitted from the vehicle information transmission section 441 of the CPU 440 after the vehicle information is recorded in the vehicle information recording section 421 at the detection time of the abnormal frame. The vehicle information recording section 421 can also read out the vehicle information from the relay circuit 430, which is a hardware unit. Thus, after the vehicle information is recorded in the vehicle information recording section 421, the vehicle information transmission section 441 of the CPU 440 can transmit the vehicle information to the relay circuit 430. For example, the second abnormality recording processing section 431 may store, in the second abnormality recording section 422, the abnormal frame together with the latest vehicle information in correlated manner. The latest vehicle information is recorded in the vehicle information recording section 421 of the memory 420 by the vehicle information transmission section 441. With this configuration, it becomes possible to correlate the vehicle information, which is more close to the detection time of the abnormal frame, with the detected abnormal frame.

Configuration of CPU 440

Figure 26:
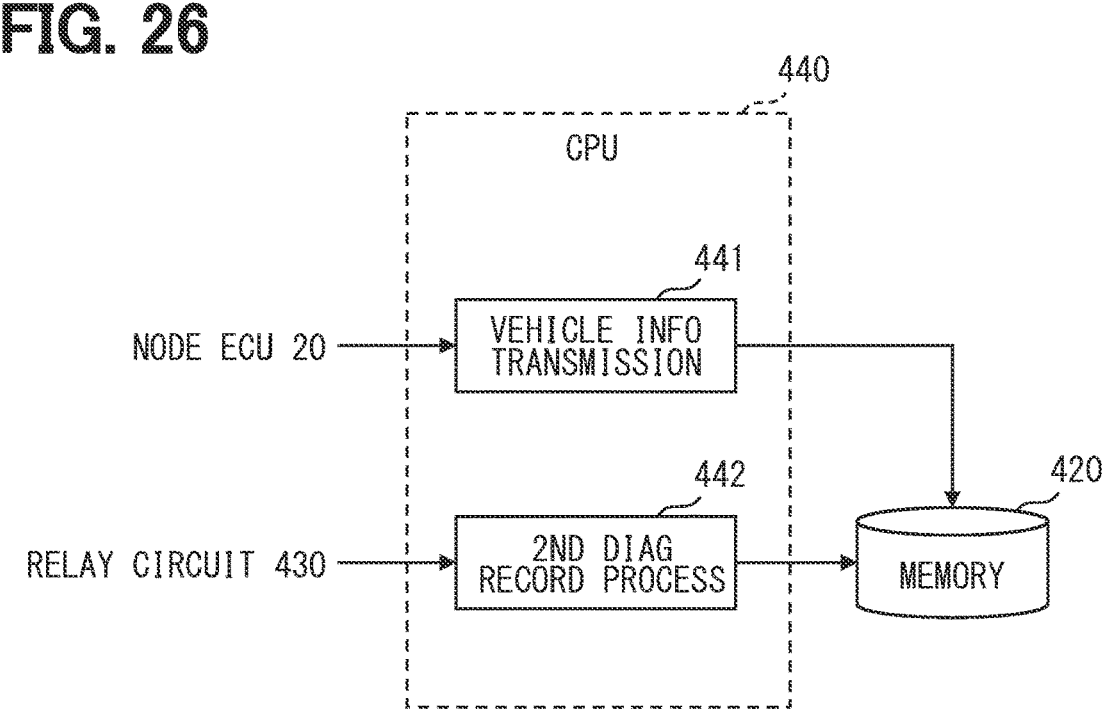
FIG. 26 is a diagram showing an example of a schematic configuration of a CPU.

The following will describe an example of a configuration of the CPU 440 with reference to FIG. 26. As shown in FIG. 26, the CPU 440 includes a vehicle information transmission section 441, a second diagnostic recording processing section 442 as functional blocks.

The vehicle information transmission section 441 records, in the vehicle information recording section 421 of the memory 420, only one record of the latest vehicle information among the multiple records of vehicle information sequentially transmitted from the end ECU 20.

The second diagnostic recording processing section 442 reads out the correlated abnormal frame and the vehicle information recorded in the second abnormality recording section 422 of the memory 420, and stores the readout data in the diagnostic information recording section 223 of the memory 420 as the diagnostic information. After the correlated abnormal frame and the vehicle information are read out by the second diagnostic recording processing section 442, the correlated abnormal frame and the vehicle information may be deleted from the second abnormality recording section 422.

The process related to the diagnostic recording by the CPU 440 may be performed in the same manner as the diagnostic recording related process shown in the flowchart of FIG. 14.

Overview of Eighth Embodiment

According to the eighth embodiment, the vehicle-mounted relay device 10e includes the second layer L2 and the third layer L3, which are implemented by the operation of hardware circuit. Thus, an occurrence of communication delay and heat generation can be suppressed. The CPU 440 only needs to execute the process of the fourth layer L4 and upper layers, it is possible to use a less sophisticated CPU 440.

According to the eighth embodiment, the CPU 440, which corresponds to the software unit, can read out, by executing a process, the diagnostic information in which the vehicle information transmitted from another electronic control unit is correlated with the abnormal frame. As a result, similar to the first embodiment, an occurrence of communication delay and heat generation can be suppressed. Further, while enabling reading out of diagnostic information about abnormal frame detected during the relay operation executed by the hardware circuit, the development cost can be suppressed.

Ninth Embodiment

In the sixth to eighth embodiments described above, the functions of the PHY 210 are provided by the FPGA 200, 300, 400. The present disclosure is not limited to this configuration. For example, the PHY 210 may be provided separately from the FPGA 200, 300, 400.

Tenth Embodiment

In the above-described embodiments, an example of using the FPGA as the hardware circuit is described. The present disclosure is not limited to this configuration. As the hardware circuit, any structure or component other than the FPGA may be used. For example, instead of FPGA, ASIC or the like may be used as the hardware circuit.

Eleventh Embodiment

A hardware circuit having the functions of the first layer L1 and the second layer L2 may be configured separately from a hardware circuit having the function of the third layer L3.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure.

What is claimed is:

1. A vehicle-mounted relay device used in a vehicle, the vehicle-mounted relay device comprising:
   a hardware unit performing a hardware operation; and
   a software unit performing a software operation,
   wherein
   the hardware operation implements functions of a first layer to a third layer of an open systems interconnection (OSI) reference model,
   the software operation implements functions of a fourth layer and upper layers of the OSI reference model,
   the hardware unit includes a second layer relay section, which implements a relay function in the second layer of the OSI reference model, and a third layer relay section, which implements a relay function in the third layer of the OSI reference model,
   the software unit includes a vehicle information recording processing section storing vehicle information, which is sequentially transmitted from another vehicle-mounted device, in a vehicle information recording section,
   the vehicle information recording section is readable by the software unit,
   the hardware unit includes a first abnormality recording processing section storing, in response to an abnormal frame being detected during a data relay in the second layer relay section or in the third layer relay section, the detected abnormal frame in a first abnormality recording section,
   the first abnormality recording section is readable by the software unit,
   the software unit includes a first diagnostic recording processing section,
   the first diagnostic recording processing section reads out the abnormal frame from the first abnormality recording section and stores the readout abnormal frame together with the vehicle information, which is read out from the vehicle information recording section, in a diagnostic information recording section as diagnostic information, and
   the diagnostic information recording section is readable by the software unit.

2. The vehicle-mounted relay device according to claim 1, wherein
   the first diagnostic recording processing section periodically reads out, from the first abnormality recording section, the abnormal frame, and
   the first diagnostic recording processing section correlates the readout abnormal frame with the vehicle information, which is recorded in the vehicle information recording section and corresponds to a readout time of the abnormal frame, and then stores the correlated abnormal frame and the vehicle information in the diagnostic information recording section as the diagnostic information.

3. The vehicle-mounted relay device according to claim 1, wherein
   the hardware unit includes:
      a counter that counts occurrence times of the abnormal frame in the second layer relay section or in the third layer relay section; and
      a count value recording processing section recording, in a count value recording section, the occurrence times of the abnormal frame counted by the counter,
   the count value recording section is readable by the software unit,
   the software unit includes a difference detection section,
   the difference detection section periodically reads out, from the count value recording section, the occurrence times of the abnormal frame and detects a difference between a currently readout occurrence times and a previously readout occurrence times,
   the vehicle information recording processing section stores, in response to the detected difference between the currently readout occurrence times and the previously readout occurrence times being equal to or greater than one, a same record number of the vehicle information as the detected difference in the vehicle information recording section,
   the vehicle information recording section is readable by the software unit,
   the first diagnostic recording processing section reads out the abnormal frame from the first abnormality recording section during when the second layer relay section and the third layer relay section are in stop states of data relay, and stores the readout abnormal frame together with the vehicle information, which is read out from the vehicle information recording section, in the diagnostic information recording section as the diagnostic information, and
   the diagnostic information recording section is readable by the software unit.

4. The vehicle-mounted relay device according to claim 1, wherein
   the hardware unit is a hardware circuit,
   the software unit is a microcomputer,
   the hardware circuit executes the functions of the first layer to the third layer of the OSI reference model, and
   the microcomputer executes the functions of the fourth layer and upper layers of the OSI reference model.

5. The vehicle-mounted relay device according to claim 4, wherein
the microcomputer includes the vehicle information recording section and the diagnostic information recording section, and
the hardware circuit includes the first abnormality recording section.

6. The vehicle-mounted relay device according to claim 1, wherein
the hardware unit is a logic circuit that performs the hardware operation in a hardware circuit,
the software unit is a processor mounted on the hardware circuit,
the functions of the first layer to the third layer of the OSI reference model are implemented by the logic circuit, and
the functions of the fourth layer and upper layers are implemented by the processor.

7. The vehicle-mounted relay device according to claim 6, further comprising
a memory mounted on the hardware circuit and shared by the logic circuit and the processor,
wherein the memory includes the vehicle information recording section, the diagnostic information recording section, and the first abnormality recording section.

8. A vehicle-mounted relay device used in a vehicle, the vehicle-mounted relay device comprising:
a hardware unit operating a hardware; and
a software unit operating a software,
wherein
the hardware unit implements functions of a first layer to a third layer of an OSI reference model,
the software unit implements functions of a fourth layer and upper layers of the OSI reference model,
the hardware unit includes a second layer relay section, which implements a relay function in the second layer of the OSI reference model, and a third layer relay section, which implements a relay function in the third layer of the OSI reference model,
the software unit includes a vehicle information transmission section that transmits, to the hardware unit, vehicle information sequentially transmitted from another vehicle-mounted device,
the hardware unit includes a second abnormality recording processing section,
the second abnormality recording processing section stores, in response to an abnormal frame being detected during a data relay in the second layer relay section or in the third layer relay section, the abnormal frame in a second abnormality recording section,
the second abnormality recording processing section stores, in the second abnormality recording section, the abnormal frame by correlating the abnormal frame with the vehicle information, which corresponds to a detection time of the abnormal frame and is transmitted from the vehicle information transmission section,
the second abnormality recording section is readable by the software unit,
the software unit includes a second diagnostic recording processing section,
the second diagnostic recording processing section reads out, from the second abnormality recording section, the abnormal frame together with the vehicle information correlated with the abnormal frame, and stores the readout abnormal frame and the readout vehicle information in a diagnostic information recording section as diagnostic information, and
the diagnostic information recording section is readable by the software unit.

9. The vehicle-mounted relay device according to claim 8, wherein
the hardware unit is a hardware circuit,
the software unit is a microcomputer,
the hardware circuit executes the functions of the first layer to the third layer of the OSI reference model, and
the microcomputer executes the functions of the fourth layer and upper layers of the OSI reference model.

10. The vehicle-mounted relay device according to claim 9, wherein
the microcomputer includes the diagnostic information recording section, and
the hardware circuit includes the second abnormality recording section.

11. The vehicle-mounted relay device according to claim 8, wherein
the hardware unit is a logic circuit that operates the hardware in a hardware circuit,
the software unit is a processor mounted on the hardware circuit,
the functions of the first layer to the third layer of the OSI reference model are implemented by the logic circuit, and
the functions of the fourth layer and upper layers are implemented by the processor.

12. The vehicle-mounted relay device according to claim 11, further comprising
a memory mounted on the hardware circuit and shared by the logic circuit and the processor,
wherein
the memory includes a vehicle information recording section, the diagnostic information recording section, and the second abnormality recording section, and
the vehicle information recording section records the vehicle information transmitted from the vehicle information transmission section.

* * * * *